(12) United States Patent
Mabuchi et al.

(10) Patent No.: US 8,182,014 B2
(45) Date of Patent: May 22, 2012

(54) VEHICLE SEAT ARRANGING STRUCTURE

(75) Inventors: Teiji Mabuchi, Aichi-ken (JP); Osamu Fujimoto, Nissin (JP); Makoto Itou, Aichi-ken (JP); Kei Matsui, Toyota (JP); Yoshihiro Suda, Tokyo-to (JP)

(73) Assignees: Toyota Jidosha Kabushiki Kaisha, Tohota-shi, Aichi-ken (JP); The University of Tokyo, Tokyo (JP)

( * ) Notice: Subject to any disclaimer, the term of this patent is extended or adjusted under 35 U.S.C. 154(b) by 0 days.

(21) Appl. No.: 12/808,895

(22) PCT Filed: Dec. 19, 2008

(86) PCT No.: PCT/IB2008/003556
§ 371 (c)(1),
(2), (4) Date: Oct. 28, 2010

(87) PCT Pub. No.: WO2009/083773
PCT Pub. Date: Jul. 9, 2009

(65) Prior Publication Data
US 2011/0031772 A1 Feb. 10, 2011

(30) Foreign Application Priority Data

Dec. 21, 2007 (JP) ................ 2007-330979

(51) Int. Cl.
*B60N 2/14* (2006.01)
*B60N 2/01* (2006.01)
(52) U.S. Cl. ............. 296/64; 296/65.06; 296/65.13
(58) Field of Classification Search ........... 296/64, 296/65.06, 65.07, 65.13; 297/344.12, 344.24, 297/344.25
See application file for complete search history.

(56) References Cited

U.S. PATENT DOCUMENTS
5,639,141 A * 6/1997 Hanemaayer ............ 296/156
(Continued)

FOREIGN PATENT DOCUMENTS
DE 10 2005 008 264 A1 8/2006
(Continued)

OTHER PUBLICATIONS

International Search Report in International Application No. PCT/IB2008/003556 (Apr. 20, 2009).

(Continued)

*Primary Examiner* — Jason S Morrow
(74) *Attorney, Agent, or Firm* — Finnegan, Henderson, Farabow, Garrett & Dunner, LLP

(57) ABSTRACT

With a vehicle seat arranging structure, a second-row passenger-side seat may be placed in a rearward slide position by sliding the second-row passenger-side seat toward the rear of a vehicle by 150 millimeters so that the second-row passenger-side seat is closer to the rear of the vehicle than the second-row driver-side seat. In addition, each of the second-row driver-side seat and the second-row passenger-side seat may be placed in an obliquely-inward frontward-oriented position by swiveling each of the second-row driver-side seat and the second-row passenger-side seat from the frontward-oriented position 10 degrees inward in the vehicle-width direction. In this way, the sense of distance between the occupants seated in the second-row driver-side seat and the second-row passenger-side seat is reduced. As a result, it is possible to promote communication between these occupants (to make it easier for these occupants to communicate with each other).

15 Claims, 17 Drawing Sheets

U.S. PATENT DOCUMENTS

| | | | |
|---|---|---|---|
| 7,380,859 B2 * | 6/2008 | Gardiner | 296/64 |
| 7,648,186 B2 * | 1/2010 | Ukai et al. | 296/65.06 |
| 2007/0284905 A1 * | 12/2007 | Bailey | 296/65.07 |
| 2009/0284061 A1 * | 11/2009 | Maier et al. | 297/344.24 |
| 2010/0052392 A1 * | 3/2010 | Lung et al. | 297/344.24 |

FOREIGN PATENT DOCUMENTS

| | | |
|---|---|---|
| DE | 10 2006 021 284 A1 | 11/2007 |
| EP | 1 693 245 A2 | 8/2006 |
| JP | 60-66538 | 5/1985 |
| JP | 60-115126 | 8/1985 |
| JP | 60-189647 | 9/1985 |
| JP | 61-207237 | 9/1986 |
| JP | 7-215113 | 8/1995 |
| JP | 9-109746 | 4/1997 |
| JP | 2001-39189 | 2/2001 |
| JP | 2001-105938 | 4/2001 |
| JP | 2001-270352 | 10/2001 |
| JP | 2002-337619 | 11/2002 |
| JP | 2004-513822 | 5/2004 |
| JP | 2004-359111 | 12/2004 |
| JP | 2007-313969 | 12/2007 |
| JP | 2007-320446 | 12/2007 |
| JP | 2007-320447 | 12/2007 |

OTHER PUBLICATIONS

Written Opinion of the International Search Authority in International Application No. PCT/IB2008/003556 (Apr. 20, 2009).

Notification of Reason(s) for Refusal in Japanese Application No. 2007-330979 (Drafting Date: Aug. 11, 2009).

* cited by examiner

VEHICLE SEAT ARRANGING STRUCTURE

CROSS-REFERENCE TO RELATED APPLICATIONS

This application is a national phase application of International Application No. PCT/IB2008/003556, filed Dec. 19, 2008, and claims the priority of Japanese Application No. 2007-330979, filed Dec. 21, 2007, the contents of both of which are incorporated herein by reference.

BACKGROUND OF THE INVENTION

1. Field of the Invention

The invention relates generally to a vehicle seat arranging structure, and more specifically to a vehicle seat arranging structure with which vehicle seats are arranged appropriately.

2. Description of the Related Art

Vehicle seat arranging structures of this type are described in, for example, Japanese Patent Application Publication No. 9-109746 (JP-A-109746) and Japanese Patent Application Publication No. 7-215113 (JP-A-215113).

According to JP-A-9-109746, a driver's seat and a passenger's seat are arranged next to each other in the vehicle-width direction, and the driver's seat is allowed to swivel inward in the vehicle-width direction by a swiveling mechanism.

According to JP-7-215113, a second-row driver-side seat and a second-row passenger-side seat are arranged behind a driver's seat and a passenger's seat, respectively, and third-row seats are arranged behind the second-row driver-side seat and the second-row passenger-side seat. According to JP-7-215113, the second-row driver-side seat and the second-row passenger-side seat are allowed to swivel around to face the third-row seats.

In the example described in JP-A-9-109746, the driver's seat is allowed to swivel inward in the vehicle-width direction by the swiveling mechanism. This structure is designed in order to have a driver take a good rest in the passenger compartment, but the relationship between occupants seated in the driver's seat and the passenger's seat is not taken into account in designing this structure.

In the example described in JP-7-215113, the second-row driver-side seat and the second-row passenger-side seat may be swiveled around to face the third-row seats. However, the second-row driver-side seat and the second-row passenger-side seat are allowed to be only in the frontward-oriented positions, at which these seats face the front of the vehicle, or the rearward-oriented positions, at which these seats face the rear of the vehicle, and the relationship between occupants seated in the second-row driver-side seat and the second-row passenger-side seat is not taken into account in designing this structure.

SUMMARY OF THE INVENTION

The invention is made in light of the above-described circumstances. The invention provides a vehicle seat arranging structure with which vehicle seats are arranged more flexibly based on the situations of occupants seated in the vehicle seats, whereby the comfort in a passenger compartment is increased.

A first aspect of the invention relates to a vehicle seat arranging structure, that includes: a plurality of vehicle seats; a seat sliding mechanism that supports at least one of the plurality of vehicle seats in such a manner that the vehicle seat supported by the seat sliding mechanism is allowed to slide with respect to a passenger compartment floor in the longitudinal direction of a vehicle; and a seat swiveling mechanism that supports at least one of the plurality of vehicle seats in such a manner that the vehicle seat supported by the seat swiveling mechanism is allowed to swivel with respect to the passenger compartment floor about a position that deviates from the longitudinal and lateral center of a seat cushion inward in the vehicle-width direction so as to be placed in any one of a frontward-oriented position, in which the vehicle seat faces the front of the vehicle, an obliquely-outward frontward-oriented position, in which the vehicle seat is oriented obliquely outward in the vehicle width-direction and faces the front of the vehicle, and an obliquely-inward frontward-oriented position, in which the vehicle seat is oriented obliquely inward in the vehicle-width direction and faces the front of the vehicle.

With the vehicle seat arranging structure according to the first aspect of the invention, for example, at least one of the plurality of vehicle seats may be placed in a staggered position in which this vehicle seat is off in the vehicle longitudinal direction from the vehicle seat next to this vehicle seat in the vehicle-width direction, and the obliquely-inward frontward-oriented position in which this vehicle seat is oriented obliquely inward in the vehicle-width direction and faces the front of the vehicle. In this way, it is possible to reduce the sense of distance between the occupant seated in this vehicle seat and the occupant seated in the vehicle seat next to this vehicle seat in the vehicle-width direction, thereby promoting communication between these occupants (making it easier for these occupants to communicate with each other).

With the vehicle seat arranging structure according to the first aspect of the invention, for example, at least one of the plurality of vehicle seats may be placed in a rearward slide position, which is reached when this vehicle seat is slid toward the rear of the vehicle, and the obliquely-outward frontward-oriented position, in which this vehicle seat is oriented obliquely outward in the vehicle-width direction and faces the front of the vehicle. In this way, it is possible to increase the sense of distance between the occupant seated in this vehicle seat and the occupant seated in the vehicle seat next to this vehicle seat in the vehicle-width direction, thereby creating a personal space for each occupant (for example, a space useful for the occupant to relax or to enjoy scenery seen from a window).

As described above, with the vehicle seat arranging structure, it is possible to arrange vehicle seats more flexibly based on the situations of the occupants seated in at least one of the plurality of vehicle seats and the vehicle seat next to this vehicle seat in the vehicle-width direction. In this way, it is possible to increase the comfort in the passenger compartment.

In addition, with the vehicle seat arranging structure according to the first aspect of the invention, the seat swiveling mechanism swivels at least one of the plurality of vehicle seats about the position that deviates from the longitudinal and lateral center of the seat cushion inward in the vehicle-width direction. Therefore, this vehicle seat is swiveled inward or outward in the vehicle-width direction by an amount smaller than that when this vehicle seat is swiveled inward or outward in the vehicle-width direction about the longitudinal and lateral center of the seat cushion. Thus, it is possible to swivel at least one of the plurality of vehicle seats inward or outward in the vehicle-width direction by just a required angle, while minimizing contact of this vehicle seat with an interior member that is positioned on the outer side of this vehicle seat.

A second aspect of the invention relates to a vehicle seat arranging structure, that includes: a driver's seat and a passenger's seat; a second-row driver-side seat and a second-row passenger-side seat that are arranged behind the driver's seat and the passenger's seat, respectively; a second-row seat sliding mechanism that supports each of the second-row driver-side seat and the second-row passenger-side seat in such a manner that each of the second-row driver-side seat and the second-row passenger-side seat is allowed to slide with respect to a passenger compartment floor in the longitudinal direction of a vehicle; and a second-row seat swiveling mechanism that supports each of the second-row driver-side seat and the second-row passenger-side seat in such a manner that each of the second-row driver-side seat and the second-row passenger-side seat is allowed to swivel with respect to the passenger compartment floor about a position that deviates from the longitudinal and lateral center of a seat cushion inward in the vehicle-width direction so as to be placed in any one of a frontward-oriented position, in which each of the second-row driver-side seat and the second-row passenger-side seat faces the front of the vehicle, an obliquely-outward frontward-oriented position, in which each of the second-row driver-side seat and the second-row passenger-side seat is oriented obliquely outward in the vehicle width-direction and faces the front of the vehicle, and an obliquely-inward frontward-oriented position, in which each of the second-row driver-side seat and the second-row passenger-side seat is oriented obliquely inward in the vehicle-width direction and faces the front of the vehicle.

With the vehicle seat arranging structure according to the second aspect of the invention, for example, the second-row driver-side seat and the second-row passenger-side seat may be placed in staggered positions in which these seats are off from each other in the vehicle longitudinal direction, and the obliquely-inward frontward-oriented positions in which these seats are oriented obliquely inward in the vehicle-width direction and face the front of the vehicle. In this way, it is possible to reduce the sense of distance between the occupants seated in the second-row driver-side seat and the second-row passenger-side seat, thereby promoting communication between these occupants (making it easier for these occupants to communicate with each other).

With the vehicle seat arranging structure according to the second aspect of the invention, for example, each of the second-row driver-side seat and the second-row passenger-side seat may be placed in a rearward slide position which is reached when each of the second-row driver-side seat and the second-row passenger-side seat is slid toward the rear of the vehicle, and the obliquely-outward frontward-oriented position in which each of the second-row driver-side seat and the second-row passenger-side seat is oriented obliquely outward in the vehicle-width direction and faces the front of the vehicle. In this way, it is possible to increase the sense of distance between the occupants seated in the second-row driver-side seat and the second-row passenger-side seat, thereby creating a personal space for each occupant (for example, a space useful for the occupant to relax or to enjoy scenery seen from a window).

With the vehicle seat arranging structure according to the second aspect of the invention, it is possible to arrange vehicle seats more flexibly based on the situations of the occupants seated in the second-row driver-side seat and the second-row passenger-side seat. In this way, it is possible to increase the comfort in the passenger compartment.

In addition, with the vehicle seat arranging structure according to the second aspect of the invention, the seat swiveling mechanism swivels each of the second-row driver-side seat and the second-row passenger-side seat about the position that deviates from the longitudinal and lateral center of the seat cushion inward in the vehicle-width direction. Therefore, each of the second-row driver-side seat and the second-row passenger-side seat is swiveled inward or outward in the vehicle-width direction by an amount smaller than that when each of these vehicle seat is swiveled inward or outward in the vehicle-width direction about the longitudinal and lateral center of the seat cushion. Thus, it is possible to swivel each of the second-row driver-side seat and the second-row passenger-side seat inward or outward in the vehicle-width direction by just a required angle while minimizing contact of these seats with interior members that are positioned on the outer sides of these vehicle seats.

In the second aspect of the invention, the second-row seat sliding mechanism may include a sliding lock device that retains at least one of the second-row driver-side seat and the second-row passenger-side seat at a desired slide position in the longitudinal direction of the vehicle, the second-row seat swiveling mechanism may include a swiveling lock device that retains at least one of the second-row driver-side seat and the second-row passenger-side seat in the frontward-oriented position; at least one of the second-row driver-side seat and the second-row passenger-side seat may include a tilting lock device that retains a seatback at a desired angle with respect to the seat cushion, and there may be provided an unlock device that places the sliding lock device and the swiveling lock device in an unlocked mode in response to unlocking of the tilting lock device.

With the vehicle seat arranging structure described above, when the tilting lock device is unlocked, the sliding lock device and the swiveling lock device are unlocked in response to unlocking of the tilting lock device. Thus, the seatback is tilted toward the front of the vehicle, and the entirety of the vehicle seat is oriented obliquely inward in the vehicle-width direction and faces toward the front of the vehicle, and the entirety of the vehicle is slid toward the front of the vehicle. In this way, it is possible to easily cause the vehicle seat to take a walk-in attitude that is an appropriate attitude when the occupant gets on or off the vehicle.

Therefore, for example, when the occupant gets on or off the vehicle through a door close to the second-row driver-side seat or the second-row passenger-side seat, the second-row driver-side seat or the second-row passenger-side seat is caused to take the walk-in attitude. Accordingly, it is possible to create wider space for the occupant to get on or off the vehicle, when the second-row driver-side seat or the second-row passenger-side seat takes the walk-in attitude than when the second-row driver-side seat or the second-row passenger-side seat is maintained at the frontward-oriented position.

A third aspect of the invention relates to a vehicle seat arranging structure that includes: a driver's seat and a passenger's seat; a second-row driver-side seat and a second-row passenger-side seat that are arranged behind the driver's seat and the passenger's seat, respectively; a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in the longitudinal direction of a vehicle so as to be placed in any one of a side-by-side position and a staggered position, wherein the driver's seat and the passenger's seat are aligned and next to each other in the vehicle-width direction when the vehicle seat supported by the front seat sliding mechanism is in the side-by-side position, and the passenger's seat is positioned between the driver's seat and the second-row driver-side seat in the longitudinal direction of the vehicle when the vehicle seat supported by the front seat sliding mechanism in the staggered position; a second-row seat sliding mechanism that supports at least one of the second-row driver-side seat and the second-row passenger-side seat in such a manner that at least one of second-row driver-side seat and the second-row passenger-side seat supported by the second-row seat sliding mechanism is allowed to slide with respect to the passenger compartment floor in the longitudinal direction of the vehicle so as to be placed in any one of a side-by-side position and a staggered position, wherein the second-row driver-side seat and the second-row passenger-side seat are aligned and next to each other in the vehicle-width direction when the vehicle seat supported by the second-row seat sliding mechanism is in the side-by-side position, and the second-row passenger-side seat is closer to the rear of the vehicle than the second-row driver-side seat when the vehicle seat supported by the second-row seat sliding mechanism is in the staggered position; and a second-row seat swiveling mechanism that supports each of the second-row driver-side seat and the second-row passenger-side seat in such a manner that each of the second-row driver-side seat and the second-row passenger-side seat is allowed to swivel with respect to the passenger compartment floor so as to be placed in any one of a frontward-oriented position, in which each of the second-row driver-side seat and the second-row passenger-side seat faces the front of the vehicle, and an obliquely-inward frontward-oriented position, in which each of the second-row driver-side seat and the second-row passenger-side seat is oriented obliquely inward in the vehicle-width direction and faces the front of the vehicle.

With the vehicle seat arranging structure according to the third aspect of the invention, for example, at least one of the second-row driver-side seat and the second-row passenger-side seat may be placed in the staggered position so that the second-row passenger-side seat is positioned closer to the rear of the vehicle than the second-row driver-side seat, at least one of the driver's seat and the passenger's seat may be placed in the staggered position so that the passenger's seat is positioned between the driver's seat and the second-row driver-side seat in the vehicle longitudinal direction, and each of the second-row driver-side seat and the second-row passenger-side seat may be placed in the obliquely-inward frontward-oriented position in which each of the second-row driver-side seat and the second-row passenger-side seat is oriented obliquely inward in the vehicle-width direction and faces the front of the vehicle. In this way, it is possible to increase the frontward visibility of the occupants seated in the second-row driver-side seat and the second-row passenger-side seat. In addition, it is possible to reduce the sense of distance among the occupants seated in the driver's seat, the passenger's seat, the second-row driver-side seat, and the second-row passenger-side seat, thereby promoting communication among these occupants (making it easier for these occupants to communicate with each other).

With the vehicle seat arranging structure according to the third aspect of the invention, it is possible to arrange vehicle seats more flexibly based on the situations of the occupants seated in the driver's seat, the passenger's seat, the second-row driver-side seat and the second-row passenger-side seat. In this way, it is possible to increase the comfort in the passenger compartment.

In the vehicle seat arranging structure according to the third aspect of the invention, the second-row seat swiveling mechanism may support each of the second-row driver-side seat and the second-row passenger-side seat in such a manner that each of the second-row driver-side seat and the second-row passenger-side seat is allowed to swivel with respect to the passenger compartment floor so as to be placed in an obliquely-outward frontward-oriented position, in which each of the second-row driver-side seat and the second-row passenger-side seat is oriented obliquely outward in the vehicle-width direction and faces the front of the vehicle.

With the vehicle seat arranging structure described above, for example, each of the second-row driver-side seat and the second-row passenger-side seat may be placed in the obliquely-outward frontward-oriented position in which each of the second-row driver-side seat and the second-row passenger-side seat is oriented obliquely outward in the vehicle-width direction and faces the front of the vehicle. In this way, it is possible to increase the sense of distance between the occupants seated in the second-row driver-side seat and the second-row passenger-side seat, thereby creating a personal space for each occupant (for example, a space useful for the occupant to relax or to enjoy scenery seen from a window).

The vehicle seat arranging structure described above may include a third-row seat that is arranged behind the second-row driver-side seat and the second-row passenger-side seat.

With the vehicle seat arranging structure described above, the above-described manner of seat arrangement for promotion of communication between the occupants or for creation of a personal space for each occupant may also be applied the third-row seats.

A fourth aspect of the invention relates to a vehicle seat arranging structure, that includes: a driver's seat and a passenger's seat; a second-row driver-side seat and a second-row passenger-side seat that are arranged behind the driver's seat and the passenger's seat, respectively; a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in the longitudinal direction of the vehicle so as to be placed in any one of a side-by-side position and a staggered position, wherein the driver's seat and the passenger's seat are aligned and next to each other in the vehicle-width direction when the vehicle seat supported by the front seat sliding mechanism is in the side-by-side position and the driver's seat is positioned between the passenger's seat and the second-row passenger-side seat in the longitudinal direction of the vehicle when the vehicle seat supported by the front seat sliding mechanism is in the staggered position; and a second-row seat swiveling mechanism that supports the second-row passenger-side seat in such a manner that the second-row passenger-side seat is allowed to swivel with respect to the passenger compartment floor so as to be placed in any one of a frontward-oriented position, in which the second-row passenger-side seat faces the front of the vehicle, and an obliquely-inward frontward-oriented position, in which the second-row passenger-side seat is oriented obliquely inward in the vehicle-width direction and faces the front of the vehicle.

With the vehicle seat arranging structure according to the fourth aspect of the invention, for example, at least one of the driver's seat and the passenger's seat may be placed in the staggered position so that the driver's seat is positioned between the passenger's seat and the second-row passenger-side seat in the vehicle longitudinal direction, and the second-row passenger-side seat may be placed in the obliquely-inward frontward-oriented position in which the second-row passenger-side seat is oriented obliquely inward in the vehicle-width direction and faces the front of the vehicle. In this way, it is possible to reduce the sense of distance between the occupants seated in the driver's seat and the second-row passenger-side seat, thereby promoting communication between these occupants, or making it easier for the occupant seated in the driver's seat to access the second-row passenger-side seat.

With the vehicle seat arranging structure according to the fourth aspect of the invention, it is possible to arrange vehicle seats more flexibly based on the conditions of the occupants seated in the driver's seat and the second-row passenger-side seat. In this way, it is possible to increase the comfort in the passenger compartment.

The vehicle seat arranging structure according to the fourth aspect of the invention may further include a second-row seat sliding mechanism that supports the second-row passenger-side seat in such a manner that the second-row passenger-side seat is allowed to slide with respect to the passenger compartment floor in the longitudinal direction of the vehicle so as to be placed in any one of a side-by-side position, in which the second-row passenger-side seat is aligned with and next to the second-row driver-side seat in the vehicle-width direction, and a staggered position, in which second-row passenger-side seat is closer to the front of the vehicle than the second-row driver-side seat.

With the vehicle seat arranging structure according the fourth aspect of the invention, for example, the second-row passenger-side seat may be placed in the staggered position in which the second-row passenger-side seat is closer to the front of the vehicle than the second-row driver-side seat. In this way, it is possible to reduce the sense of distance between the occupants seated in the driver's seat and the second-row passenger-side seat, thereby further promoting communication between these occupants, or making it easier for the occupant seated in the driver's seat to access the second-row passenger-side seat.

A fifth aspect of the invention relates to a vehicle seat arranging structure, that includes: a driver's seat and a passenger's seat; a second-row driver-side seat and a second-row passenger-side seat that are arranged behind the driver's seat and the passenger's seat, respectively; a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in the longitudinal direction of a vehicle so as to be placed in any one of a side-by-side position and a staggered position, wherein the driver's seat and the passenger's seat are aligned and next to each other in the vehicle-width direction when the vehicle seat supported by the front seat sliding mechanism is in the side-by-side position, and the passenger's seat is positioned between the driver's seat and the second-row driver-side seat in the longitudinal direction of the vehicle when the vehicle seat supported by the front seat sliding mechanism is in the staggered position; and a second-row seat swiveling mechanism that supports the second-row driver-side seat in such a manner that the second-row driver-side seat is allowed to swivel with respect to the passenger compartment floor so as to be placed in any one of a frontward-oriented position, in which the second-row driver-side seat faces the front of the vehicle, and an obliquely-inward frontward-oriented position, in which the second-row driver-side seat is oriented obliquely inward in the vehicle-width direction and faces the front of the vehicle.

With the vehicle seat arranging structure according to the fifth aspect of the invention, for example, at least one of the driver's seat and the passenger's seat may be placed in the staggered position so that the passenger's seat is positioned between the driver's seat and the second-row driver-side seat in the vehicle longitudinal direction, and the second-row driver-side seat may be placed in the obliquely-inward frontward-oriented position in which the second-row driver-side seat is oriented obliquely inward in the vehicle-width direction and faces the front of the vehicle. In this way, it is possible to reduce the sense of distance between the occupants seated in the passenger's seat and the second-row driver-side seat, thereby promoting communication between these occupants or making it easier for the occupant seated in the passenger's seat to access the second-row driver-side seat.

With the vehicle seat arranging structure according to the fifth aspect of the invention, it is possible to arrange vehicle seats more flexibly based on the situations of the occupants seated in the passenger's seat and the second-row driver-side seat. In this way, it is possible to increase the comfort in the passenger compartment.

The vehicle seat arranging structure according to the fifth aspect of the invention may further include a second-row seat sliding mechanism that supports the second-row driver-side seat in such a manner that the second-row driver-side seat is allowed to slide with respect to the passenger compartment floor in the longitudinal direction of the vehicle so as to be placed in any one of a side-by-side position, in which the second-row driver-side seat is aligned with and next to the second-row passenger-side seat in the vehicle-width direction, and a staggered position, in which the second-row driver-side seat is closer to the front of the vehicle than the second-row passenger-side seat.

With the vehicle seat arranging structure described above, for example, the second-row driver-side seat is placed in the staggered position in which the second-row driver-side seat is closer to the front of the vehicle than the second-row passenger-side seat. In this way, it is possible to further reduce the sense of distance between the occupants sated in the passenger's seat and the second-row driver-side seat, thereby further promoting communication between these occupants or making it easier for the occupant sated in the passenger's seat to access the second-row driver-side seat.

The vehicle seat arranging structure described above may include a passenger's seat swiveling mechanism that supports the passenger's seat in such a manner that the passenger's seat is allowed to swivel with respect to the passenger compartment floor about a position that deviates from the longitudinal and lateral center of a seat cushion inward in the vehicle-width direction so as to be placed in any one of a frontward-oriented position, in which the passenger's seat faces the front of the vehicle, an obliquely-outward frontward-oriented position, in which the passenger's seat is oriented obliquely outward in the vehicle-width direction and faces the front of the vehicle, and an obliquely-inward frontward-oriented position, in which the passenger's seat is oriented obliquely inward in the vehicle-width direction and faces the front of the vehicle.

With the vehicle seat arranging structure described above, it is possible to arrange vehicle seats more flexibly based on the situations of the occupants seated in the second-row driver-side seat and the second-row passenger-side seat. In this way, it is possible to further increase the comfort in the passenger compartment.

As described above, according to the aspects of the invention, it is possible to arrange vehicle seats more flexibly based on the conditions of the occupants seated in the vehicle seats. Thus, it is possible to increase the comfort in the passenger compartment.

BRIEF DESCRIPTION OF THE DRAWINGS

The features, advantages and technical and industrial significance of this invention will be described in the following detailed description of an example embodiment of the invention with reference to the accompanying drawings, wherein the same or corresponding portions will be denoted by the same reference numerals and wherein.

DETAILED DESCRIPTION OF THE EMBODIMENT

Hereafter, an embodiment of the invention will be described with reference to the accompanying drawings. In the embodiment, a vehicle seat arranging structure according to the invention is applied to an automobile, for example, a mini-van.

In each drawing, an arrow UP, an arrow FR, and an arrow OUT indicate upward in the height direction, frontward in the longitudinal direction, and outward in the width direction of a vehicle to which a vehicle seat arranging structure 10 according to the embodiment of the invention is applied.

Figure 1:
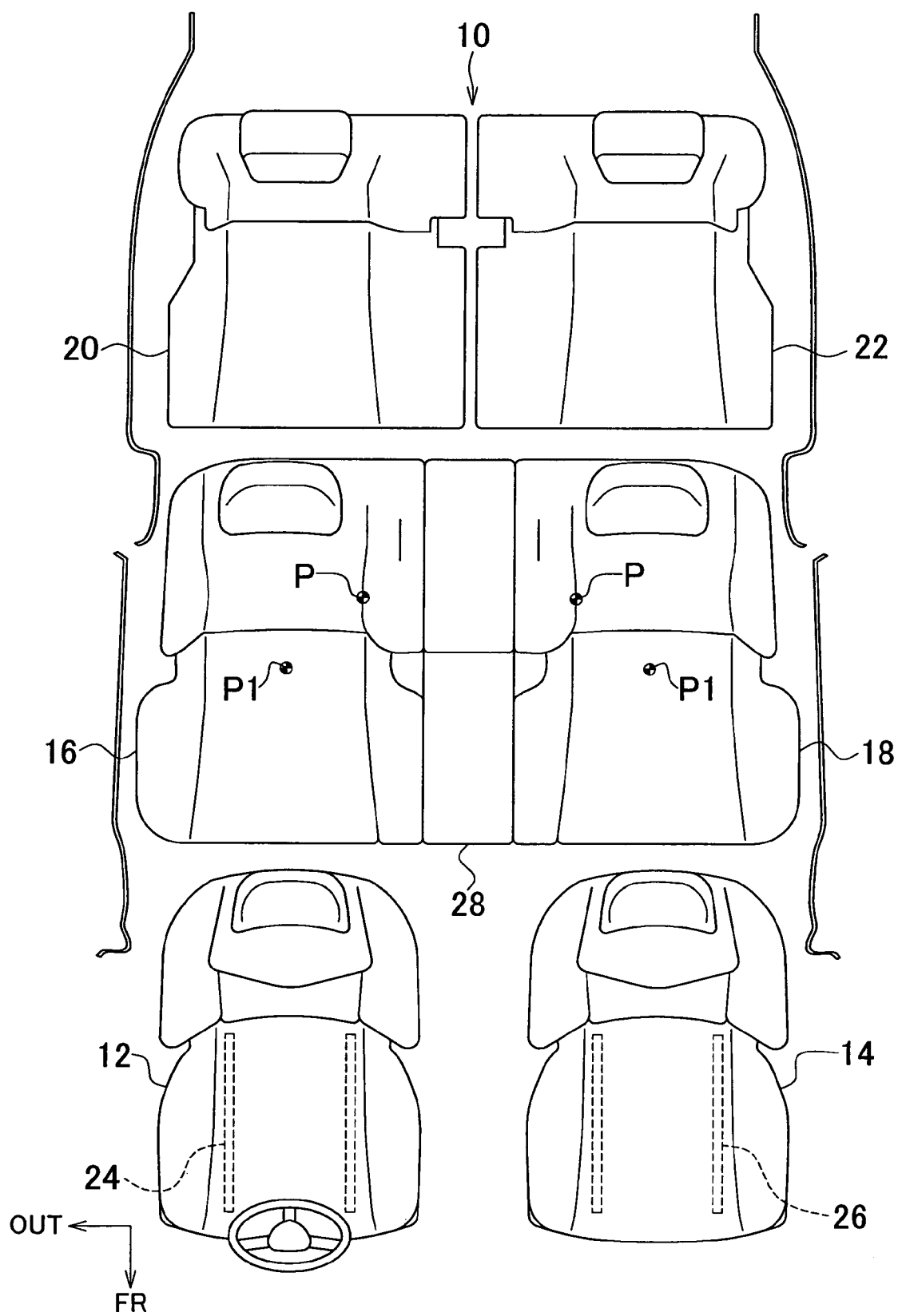
FIG. 1 is a plane view showing the state in a passenger compartment of a vehicle to which a vehicle seat arranging structure according to an embodiment of the invention is applied.

FIG. 1 is a plane view showing the state in a passenger compartment of the vehicle to which the vehicle seat arranging structure 10 according to the embodiment of the invention is applied. As shown in FIG. 1, a driver's seat 12 and a passenger's seat 14 are arranged in the first row, a second-row driver-side seat 16 and a second-row passenger-side seat 18 are arranged in the second row, and third-row seats 20 and 22 are arranged in the third row in this order from the front toward the rear of the vehicle.

The driver's seat 12 and the passenger's seat 14 are supported by a front seat sliding mechanism 24 and a front seat sliding mechanism 26, which are provided between these seats 12, 14 and a passenger compartment floor, respectively, in such a manner that the driver's seat 12 and the passenger's seat 14 are allowed to slide with respect to the passenger compartment floor in the vehicle longitudinal direction.

The second-row driver-side seat 16 and the second-row passenger-side seat 18 are supported by second-row seat sliding mechanisms and second-row seat swiveling mechanisms, described later in detail, in such a manner that the second-row driver-side seat 16 and the second-row passenger-side seat 18 are allowed to slide with respect to the passenger compartment floor in the vehicle longitudinal direction and are allowed to swivel with respect to the passenger compartment floor.

Figure 11:
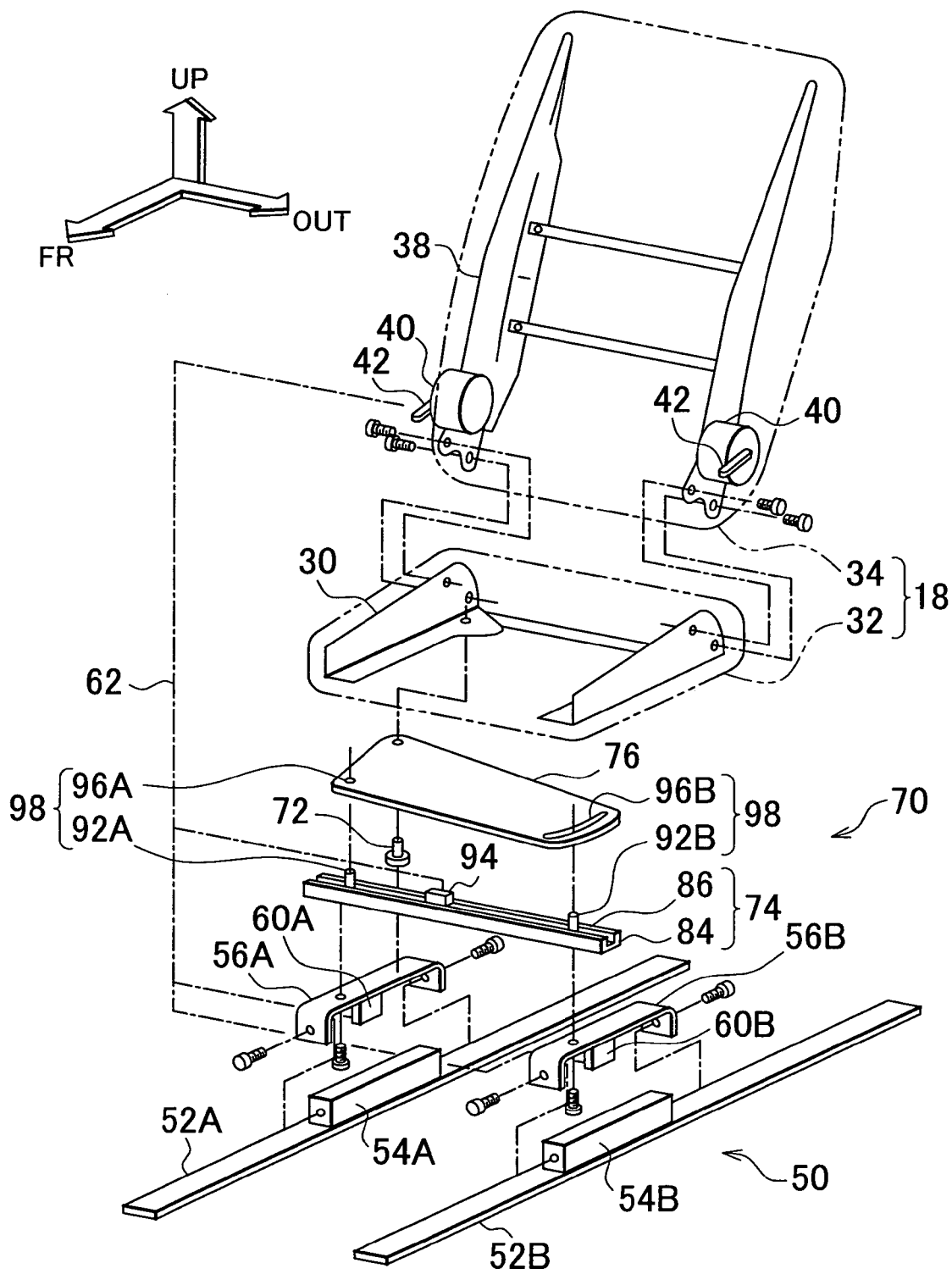
FIG. 11 is an exploded perspective view showing the structures of a second-row seat sliding mechanism and a second-row seat swiveling mechanism provided in the second-row passenger-side seat in FIG. 1.

FIG. 11 is an exploded perspective view that shows the structures of a second-row seat sliding mechanism 50 and a second-row seat swiveling mechanism 70 of the second-row passenger-side seat 18.

A second-row seat sliding mechanism and a second-row seat swiveling mechanism of the second-row driver-side seat 16 are line-symmetric with the second-row seat sliding mechanism 50 and the second-row seat swiveling mechanism 70 of the second-row passenger-side seat 18 shown in FIG. 11. Therefore, the second-row seat sliding mechanism and the second-row seat swiveling mechanism of the second-row driver-side seat 16 will not be described below.

As shown in FIG. 11, the second-row seat sliding mechanism 50 includes a pair of slide rails 52A and 52B, a pair of sliders 54A and 54B, and a pair of retaining brackets 56A and 56B. The retaining brackets 56A and 56B are provided with longitudinal sliding lock mechanisms 60A and 60B that retain the sliders 54A and 54B at desired slide positions of the slide rails 52A and 52B in the vehicle longitudinal direction, respectively.

The longitudinal sliding lock mechanisms 60A and 60B are connected to an unlock lever 42 of a seatback frame 38 via a cable 62, which serves as an unlocking device. The mode of the longitudinal sliding lock mechanisms 60A and 60B is switched between the locked mode and the unlocked mode in response to an operation of the unlock lever 42.

The seatback frame 38 included in a seatback 34 is provided with tilt mechanisms 40 used to adjust the tilt angle of the seatback frame 38 with respect to a seat cushion frame 30 included in a seat cushion 32. The tilt mechanisms 40 function as tilting lock devices that retain the seatback 34 at a desired tilt angle with respect to the seat cushion 32. The mode of the tilt mechanisms 40 is switched between the locked mode and the unlocked mode in response to an operation of the unlock lever 42.

The second-row seat swiveling mechanism 70 includes a hinge pin 72, a lateral sliding mechanism 74, and a base frame 76.

An upper end portion of the hinge pin 72 is rotatably fixed to the seat cushion frame 30 at a position that deviates from the longitudinal and lateral center of the seat cushion frame 30 toward the rear and toward the lateral center of the vehicle, and a base end portion of the hinge pin 72 is fixed in such a manner that the base end portion is not allowed to rotate with respect to the retaining brackets 56A and 56B. That is, in the second-row passenger-side seat 18, the hinge pin 72 is used as a swivel center P (see FIG. 1).

The lateral sliding mechanism 74 includes a slide rail 82 and a slider 86. The slide rail 82 extends in the vehicle-width direction, and is fixed integrally to the retaining brackets 56A and 56B.

Stud pins 92A and 92B are fitted to the slider 86 provided at respective ends in the vehicle-width direction, and extend upward in the vehicle-height direction. The stud pins 92A and 92B are fitted in guide holes 96A and 96B of the base frame 76 in such a manner that the stud pins 92A and 92B are movable within the guide holes 96A and 96B, respectively.

The lateral sliding mechanism 74 is provided with a lateral sliding lock mechanism 94 that retains the slider 86 at a desired slide position of the slide rail 82 in the vehicle-width direction. The lateral sliding lock mechanism 94 is connected to the unlock lever 42 via the cable 62, and the mode of the lateral sliding lock mechanism 94 is switched between the locked mode and the unlocked mode in response to an operation of the unlock lever 42.

The base frame 76 is fixed to the seat cushion frame 30 in such a manner that the base frame 76 is able to swivel together with the seat cushion frame 30. The guide holes 96A and 96B are formed in the base frame 76 at respective ends in the longitudinal direction of the base frame 76 (in the vehicle-width direction), and pass through the base frame 76 in the thickness direction of the base frame 76. The guide holes 96A and 96B and the stud pins 92A and 92B constitute linking mechanisms 98, and link the slide motion of the slider 86 in the vehicle-width direction with the swiveling motion of the base frame 76 about the hinge pin 72.

The second-row passenger-side seat 18 is in the frontward-oriented position, in which the second-row passenger-side seat 18 faces the front of the vehicle, when the stud pin 92B is at the middle portion of the guide hole 96B in the longitudinal direction of the guide hole 96B. When the stud pin 92B is at one end of the guide hole 96B in the longitudinal direction of the guide hole 96B, the second-row passenger-side seat 18 is in an obliquely-inward frontward-oriented position which is reached when the second-row passenger-side seat 18 is swiveled from the frontward-oriented position 15 degrees inward in the vehicle-width direction, and in which the second-row passenger-side seat 18 is oriented obliquely inward in the vehicle-width direction and faces the front of the vehicle. When the stud pin 92B is at the other end of the guide hole 96B in the longitudinal direction of the guide hole 96B, the second-row passenger-side seat 18 is in an obliquely-outward frontward-oriented position which is reached when the second-row passenger-side seat 18 is swiveled from the frontward-oriented position 5 degrees outward in the vehicle-width direction, and in which the second-row passenger-side seat 18 is oriented obliquely outward and faces the front of the vehicle.

The second-row passenger-side seat 18 is structured in such a manner that a tilt angle of the seatback 34, a slide position of the seatback 34 in the vehicle longitudinal direction, and an angle by which the seatback 34 is swiveled inward or outward in the vehicle-width direction may be set as desired by operating the unlock lever 42.

A second-row middle seat 28 provided between the second-row driver-side seat 16 and the second-row passenger-side seat 18 as shown in FIG. 1 is a dismountable seat that may be taken away from the passenger compartment with the use of a housing mechanism (not shown) and a moving mechanism (not shown).

Next, the effects of the vehicle seat arranging structure 10 according to the embodiment of the invention will be described.

With the vehicle seat arranging structure 10 according to the embodiment of the invention, the vehicle seats may be arranged, for example, in the following manner.

Figure 2:
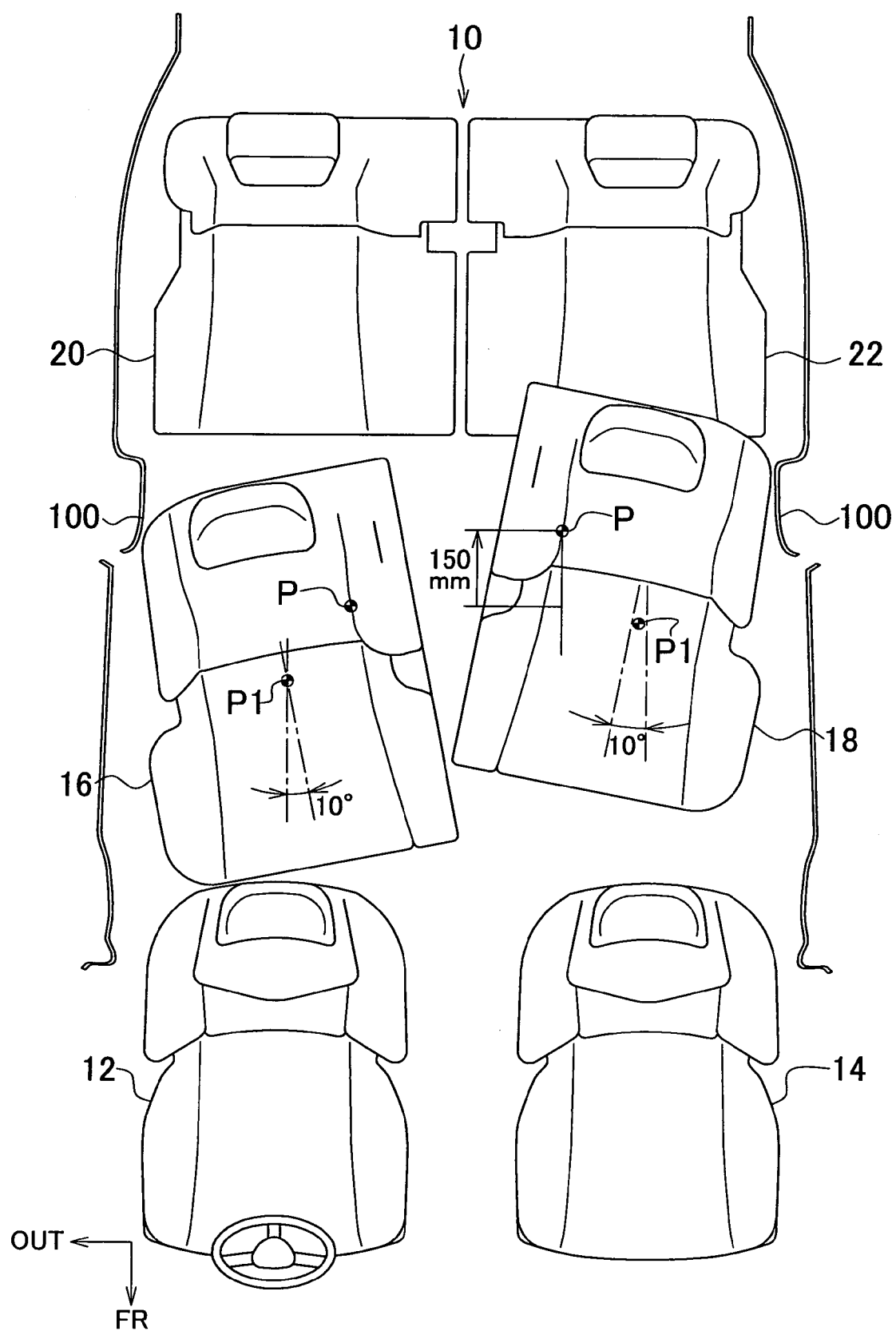
FIG. 2 is a view showing a first seat arrangement pattern that is realized by the vehicle seat arranging structure shown in FIG. 1.
Figure 3:
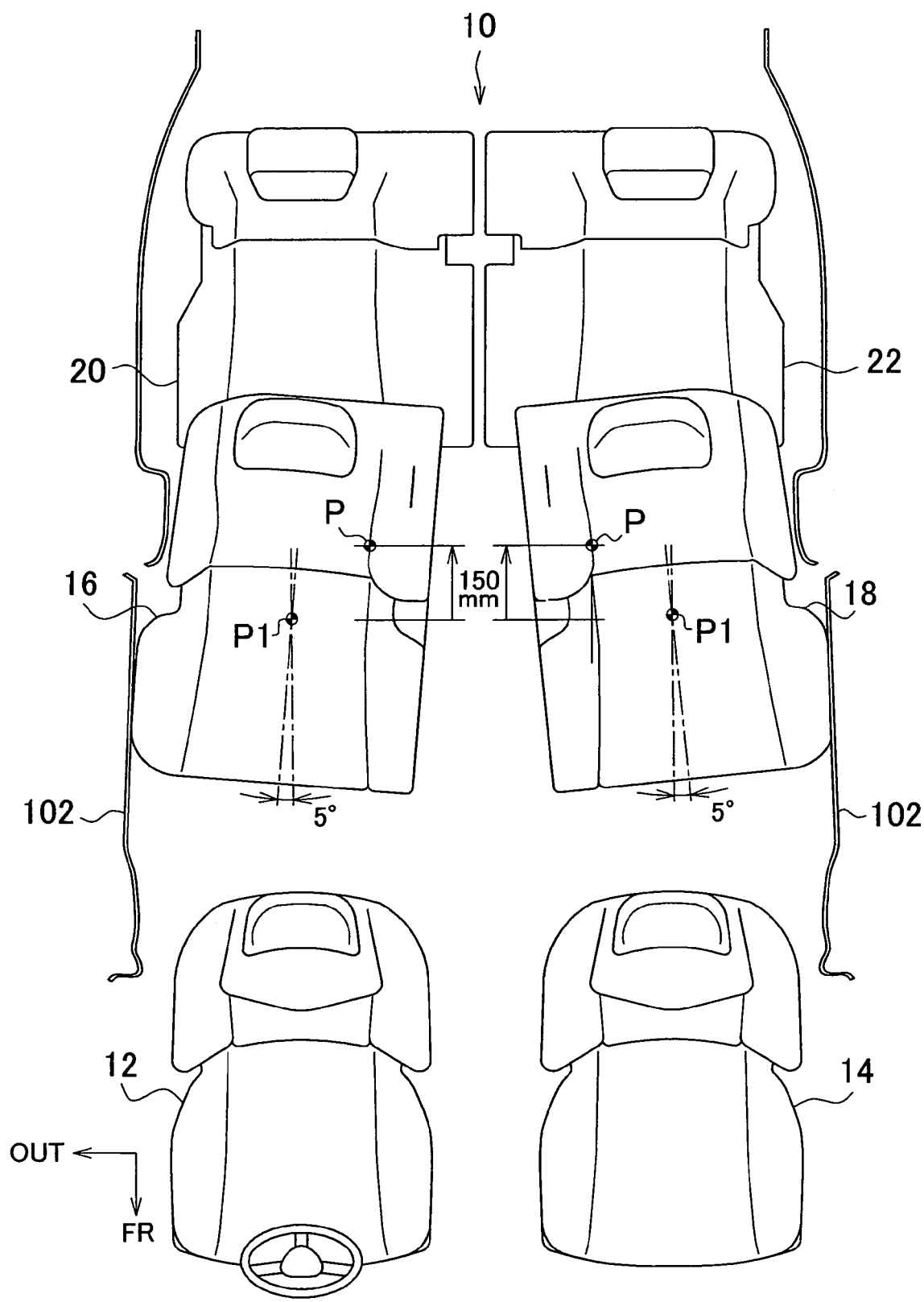
FIG. 3 is another view showing the first seat arrangement pattern that is realized by the vehicle seat arranging structure shown in FIG. 1.

First, a first seat arrangement pattern will be described. FIGS. 2 and 3 show the first seat arrangement pattern that is realized by the vehicle seat arranging structure 10 according to the embodiment of the invention. The first seat arrangement pattern shown in FIG. 2 is realized by moving the second-row driver-side seat 16 and the second-row passenger-side seat 18 from the positions in the regular seat arrangement pattern shown in FIG. 1 in the following manner. In the first seat arrangement pattern shown in FIG. 2, the second-row passenger-side seat 18 is placed in a rearward slide position which is reached when the second-row passenger-side seat 18 is slid toward the rear of the vehicle by 150 millimeters, and in which the second-row passenger-side seat 18 is closer to the rear of the vehicle than the second-row driver-side seat 16. In addition, each of the second-row driver-side seat 16 and the second-row passenger-side seat 18 is placed in an obliquely-inward frontward-oriented position which is reached when each of the second-row driver-side seat 16 and the second-row passenger-side seat 18 is swiveled from the frontward-oriented position 10 degrees inward in the vehicle-width direction.

In this way, the sense of distance between an occupant seated in the second-row driver-side seat 16 and an occupant seated in the second-row passenger-side seat 18 is reduced. Therefore, it is possible to promote communication between these occupants (to make it easier for these occupants to communicate with each other).

The first seat arrangement pattern shown in FIG. 3 is realized by moving the second-row driver-side seat 16 and the second-row passenger-side seat 18 from the positions in the regular seat arrangement pattern shown in FIG. 1 in the following manner. In the first seat arrangement pattern shown in FIG. 3, each of the second-row driver-side seat 16 and the second-row passenger-side seat 18 is placed in a rearward slide position that is reached when each of the second-row driver-side seat 16 and the second-row passenger-side seat 18 is slid toward the rear of the vehicle by 150 millimeters, and in an obliquely-outward frontward-oriented position which is reached when each of the second-row driver-side seat 16 and the second-row passenger-side seat 18 is swiveled from the frontward-oriented position 5 degrees outward in the vehicle-width direction.

In this way, the sense of distance between the occupant seated in the second-row driver-side seat 16 and the occupant seated in the second-row passenger-side seat 18 is increased. Therefore, it is possible to create a personal space for each occupant (for example, a space useful for the occupant to relax or to enjoy scenery seen from a window).

As described above, with the vehicle seat arranging structure 10 according to the embodiment of the invention, it is possible to arrange the vehicle seats more flexibly based on the situations of the occupants seated in the second-row driver-side seat 16 and the second-row passenger-side seat 18.

In the vehicle seat arranging structure 10 according to the embodiment of the invention, the third-row seat 20 and the third-row seat 22 are arranged behind the second-row driver-side seat 16 and the second-row passenger-side seat 18, respectively. Therefore, the above-described manner of seat arrangement for promotion of communication between the occupants or for creation of a personal space for each occupant may also be applied the third-row seats 20 and 22.

In addition, in the vehicle seat arranging structure 10 according to the embodiment of the invention, each of the second-row seat swiveling mechanism and the second-row seat swiveling mechanism 70 that swivel the second-row driver-side seat 16 and the second-row passenger-side seat 18, respectively, is structured in such a manner that a position that deviates inward in the vehicle-width direction from the longitudinal and lateral center P1 of the seat cushion 32 (more specifically, a position that deviates inward in the vehicle-width direction and rearward in the vehicle longitudinal direction from the longitudinal and lateral center P1) is used as the swivel center P about which the vehicle seat is swiveled, as shown in FIGS. 1 to 3.

Therefore, when each of the second-row driver-side seat 16 and the second-row passenger-side seat 18 is swiveled inward or outward in the vehicle-width direction, the amount by which each of the second-row driver-side seat 16 and the second-row passenger-side seat 18 is moved inward or outward in the vehicle-width direction is smaller than that when the lateral and longitudinal center of the seat cushion is used as the swivel center.

Thus, it is possible to swivel each of the second-row driver-side seat 16 and the second-row passenger-side seat 18 inward or outward in the vehicle-width direction by just a required angle while minimizing contact of the second-row driver-side seat 16 and the second-row passenger-side seat 18 with interior members 100 and 102 (for example, pillar garnishes) provided in the passenger compartment, which are positioned outside of the second-row driver-side seat 16 and the second-row passenger-side seat 18 in the vehicle-width direction.

According to the first seat arrangement pattern shown in FIG. 2, it is possible to increase the foot spaces for the occupants seated in the third-row seats 20 and 22 by swiveling the second-row driver-side seat 16 and the second-row passenger-side seat 18 inward in the vehicle-width direction. In addition, if a display unit is provided at the center portion of a ceiling in the front-side of the passenger compartment, the occupants seated in the second-row driver-side seat 16 and the second-row passenger-side seat 18 can see the screen of the display unit by just slightly changing the direction of their eyes.

Also, it is possible to increase the forward visibility of the occupants seated in the second-row driver-side seat 16, the second-row passenger-side seat 18, and the third-row seats 20 and 22 by swiveling the second-row driver-side seat 16 and the second-row passenger-side seat 18 inward in the vehicle-width direction.

In addition, it is possible to increase the outward visibility of the occupants seated in the second-row driver-side seat 16 and the second-row passenger-side seat 18 by swiveling the second-row driver-side seat 16 and the second-row passenger-side seat 18 outward in the vehicle-width direction.

Figure 4:
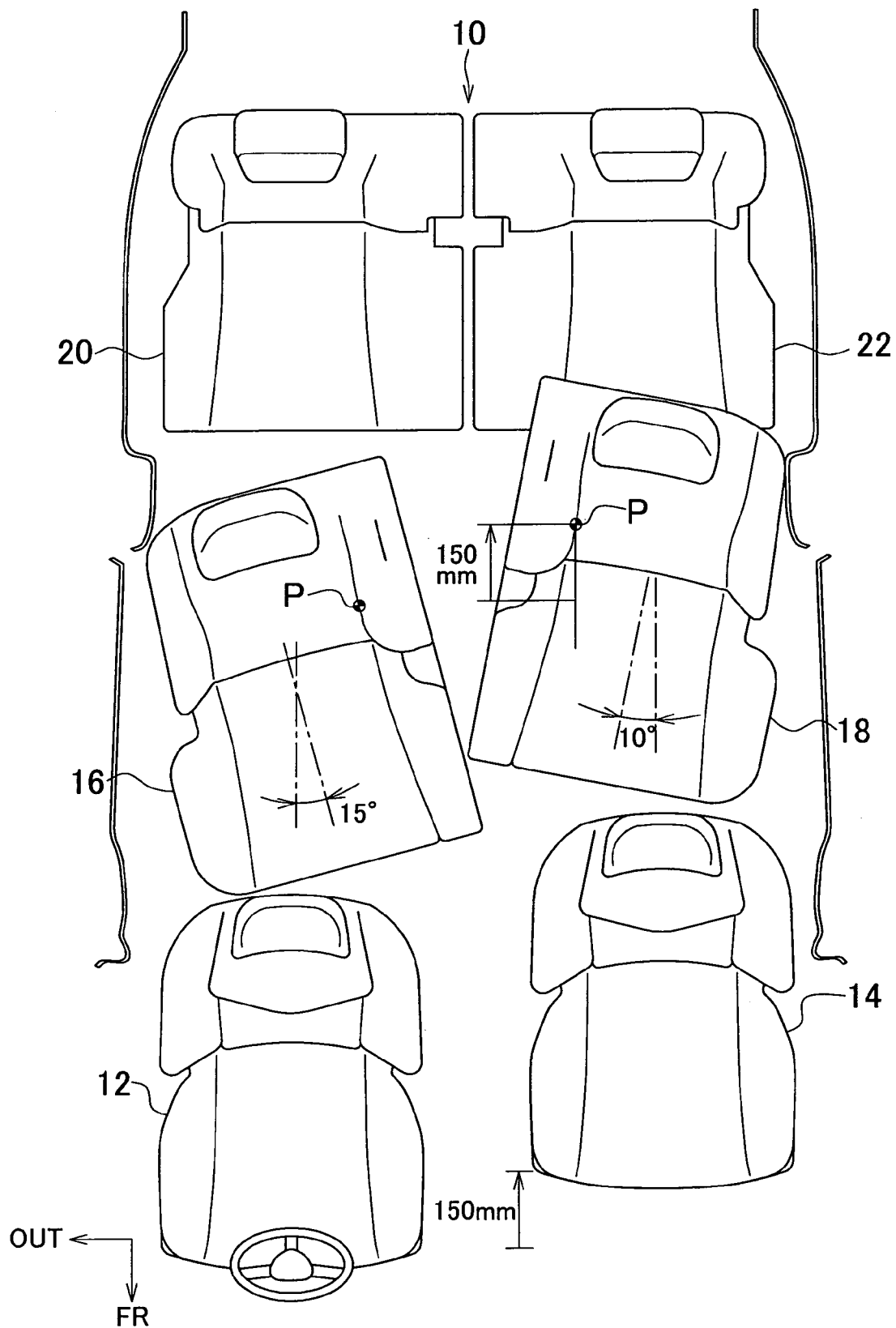
FIG. 4 is a view showing a second seat arrangement pattern that is realized by the vehicle seat arranging structure shown in FIG. 1.
Figure 5:
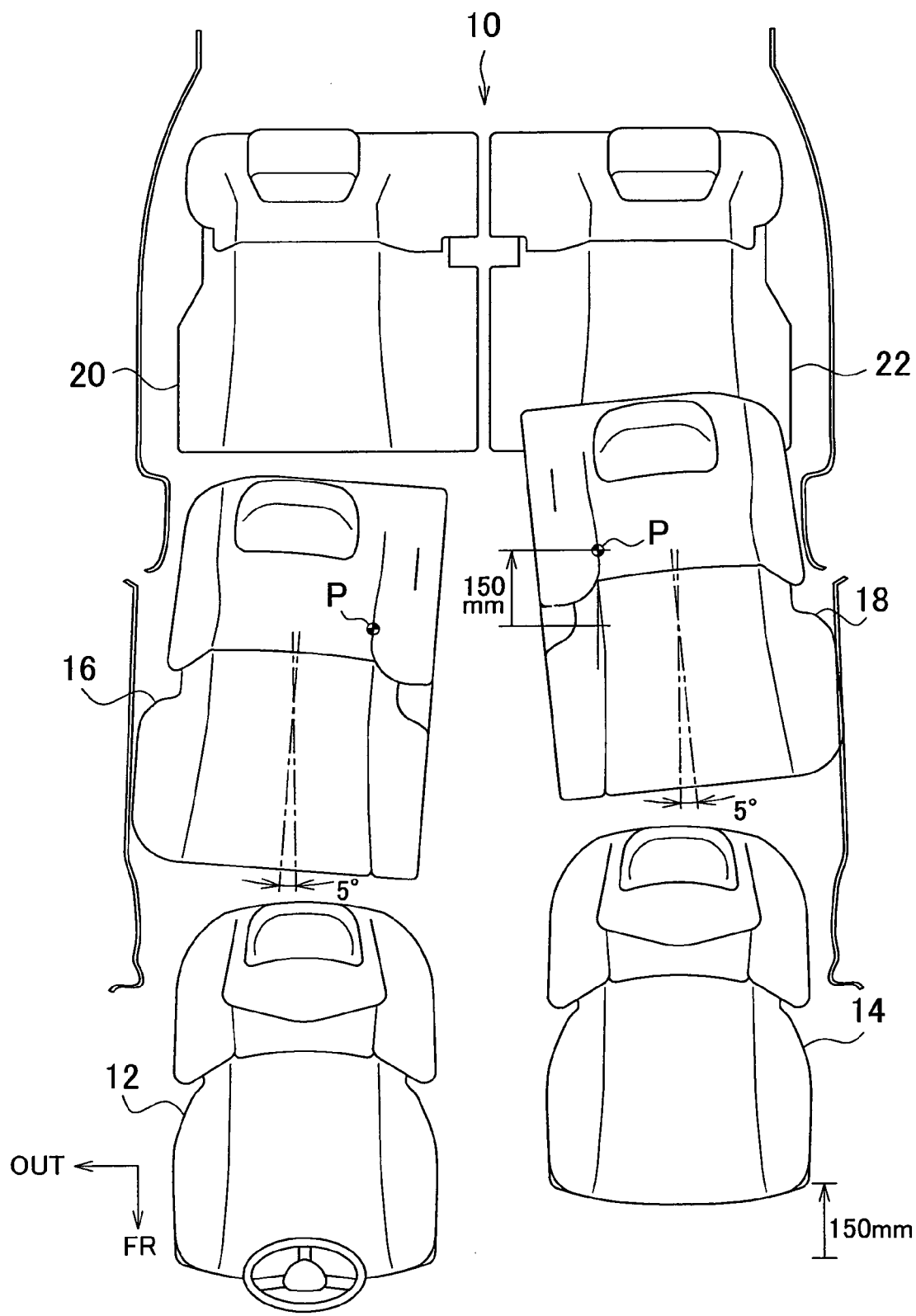
FIG. 5 is another view showing the second seat arrangement pattern that is realized by the vehicle seat arranging structure shown in FIG. 1.

Next, a second seat arrangement pattern will be described. FIGS. 4 and 5 show the second seat arrangement pattern that is realized by the vehicle seat arranging structure 10 according to the embodiment of the invention. The second seat arrangement pattern shown in FIG. 4 is realized by moving the second-row driver-side seat 16 and the second-row passenger-side seat 18 from the positions in the regular seat arrangement pattern shown in FIG. 1 in the following manner. In the second seat arrangement pattern shown in FIG. 4, the second-row passenger-side seat 18 is placed in a rearward slide position (staggered position) which is reached when the second-row passenger-side seat 18 is slid toward the rear of the vehicle by 150 millimeters, and in which the second-row passenger-side seat 18 is closer to the rear of the vehicle than the second-row driver-side seat 16. In addition, the passenger's seat 14 is placed in a rearward slide position (staggered position) which is reached when the passenger's seat 14 is slid toward the rear of the vehicle by 150 millimeters, and in which the passenger's seat 14 is positioned between the driver's seat 12 and the second-row driver-side seat 16 in the vehicle longitudinal direction. In addition, the second-row driver-side seat 16 is placed in an obliquely-inward frontward-oriented position which is reached when the second-row driver-side seat 16 is swiveled from the frontward-oriented position 15 degrees inward in the vehicle-width direction, and the second-row passenger-side seat 18 is placed in an obliquely-inward frontward-oriented position which is reached when the second-row passenger-side seat 18 is swiveled from the frontward-oriented position 10 degrees inward in the vehicle-width direction.

In this way, it is possible to increase the frontward visibility of the occupants seated in the second-row driver-side seat 16 and the second-row passenger-side seat 18, and reduce the sense of distance among the occupants seated in the driver's seat 12, the passenger's seat 14, the second-row driver-side seat 16, the second-row passenger-side seat 18, and the third-row seats 20 and 22. Therefore, it is possible to promote communication between these occupants (to make it easier for these occupants to communicate with each other).

FIG. 5 shows the state which is the same as that shown in FIG. 4 except that each of the second-row driver-side seat 16 and the second-row passenger-side seat 18 is placed in an obliquely-inward frontward-oriented position that is reached when each of the second-row driver-side seat 16 and the second-row passenger-side seat 18 is swiveled from the frontward-oriented position 5 degrees outward in the vehicle-width direction.

In this way, the sense of distance between the occupant seated in the second-row driver-side seat 16 and the occupant seated in the second-row passenger-side seat 18 is increased. Therefore, it is possible to create a personal space for each occupant (for example, a space useful for the occupant to relax or to enjoy scenery seen from a window).

In the vehicle seat arranging structure 10 according to the embodiment of the invention, the third-row seat 20 and the third-row seat 22 are arranged behind the second-row driver-side seat 16 and the second-row passenger-side seat 18, respectively. Therefore, the above-described manner of seat arrangement for creation of a personal space for each occupant may also be applied the third-row seats 20 and 22.

As described above, with the vehicle seat arranging structure 10 according to the embodiment of the invention, it is possible to arrange the vehicle seats more flexibly based on the situations of the occupants seated in the driver's seat 12, the passenger's seat 14, the second-row driver-side seat 16, the second-row passenger-side seat 18, and the third-row seats 20 and 22.

Figure 6:
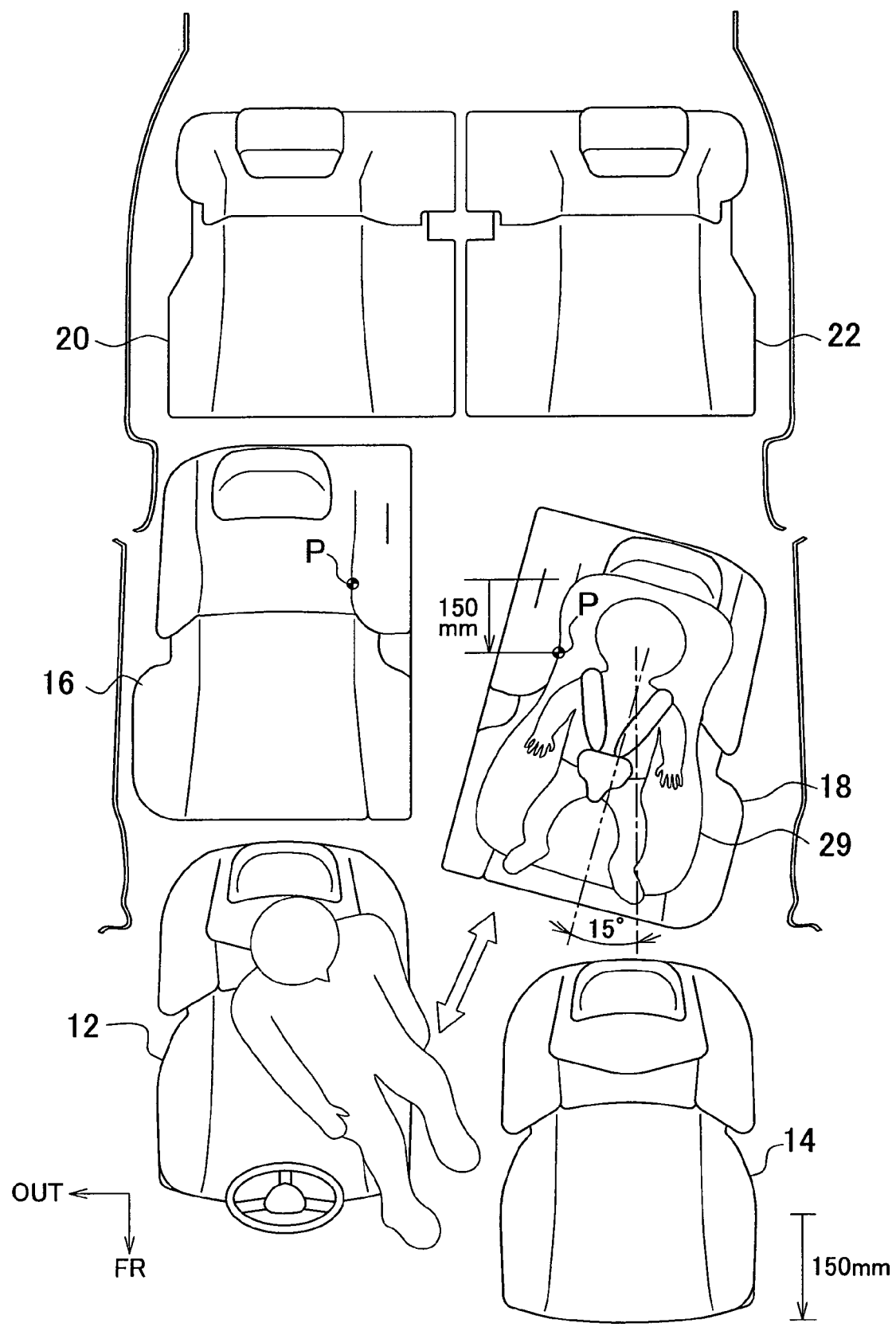
FIG. 6 is a view showing a third seat arrangement pattern that is realized by the vehicle seat arranging structure shown in FIG. 1.

Next, a third seat arrangement pattern will be described. FIG. 6 shows the third seat arrangement pattern that is realized by the vehicle seat arranging structure 10 according to the embodiment of the invention. The third seat arrangement pattern shown in FIG. 6 is realized by moving the second-row passenger-side seat 18 and the passenger's seat 14 from the positions in the regular seat arrangement pattern shown in FIG. 1 in the following manner. In the third seat arrangement pattern shown in FIG. 6, the second-row passenger-side seat 18 is placed in a frontward slide position (staggered position) which is reached when the second-row passenger-side seat 18 is slid toward the front of the vehicle by 150 millimeters, and in which the second-row passenger-side seat 18 is closer to the front of the vehicle than the second-row driver-side seat

16. In addition, the passenger's seat 14 is placed in a frontward slide position (staggered position) which is reached when the passenger's seat 14 is slid toward the front of the vehicle by 150 millimeters. When the passenger's seat 14 is in this frontward slide position, the driver's seat 12 is positioned between the passenger's seat 14 and the second-row passenger-side seat 18 in the vehicle longitudinal direction. In addition, the second-row passenger-side seat 18 is placed in an obliquely-inward frontward-oriented position which is reached when the second-row passenger-side seat 18 is swiveled from the frontward-oriented position 15 degrees inward in the vehicle-width direction. A child seat 29 is attached to the second-row passenger-side seat 18.

In this way, the second-row passenger-side seat 18 comes closer to the driver's seat 12 and faces toward the driver's seat 12. Therefore, the sense of distance between the occupant seated in the driver's seat 12 and the child seated in the child seat 29 attached to the second-row passenger-side seat 18 is reduced. As a result, it is possible to promote communication between the occupant seated in the driver's seat 12 and the child seated in the child seat 29, and to make it easier for the occupant seated in the driver's seat 12 to access the child seated in the child seat 29 (that is, to make it easier for the occupant seated in the driver's seat 12 to take care of the child seated in the child seat 29).

Especially, because the second-row passenger-side seat 18 is in the frontward slide position (staggered position) which is reached by sliding the second-row passenger-side seat 18 toward the front of the vehicle by 150 millimeters, it is possible to further reduce the sense of distance between the occupants seated in the driver's seat 12 and the second-row passenger-side seat 18 to further promote communication between these occupants or to make it easier for the occupant seated in the driver's seat 12 to access the child seated in the second-row passenger-side seat 18.

As described above, with the vehicle seat arranging structure 10 according to the embodiment of the invention, it is possible to arrange the vehicle seats more flexibly based on the situations of the occupants seated in the driver's seat 12 and the second-row passenger-side seat 18.

Figure 7:
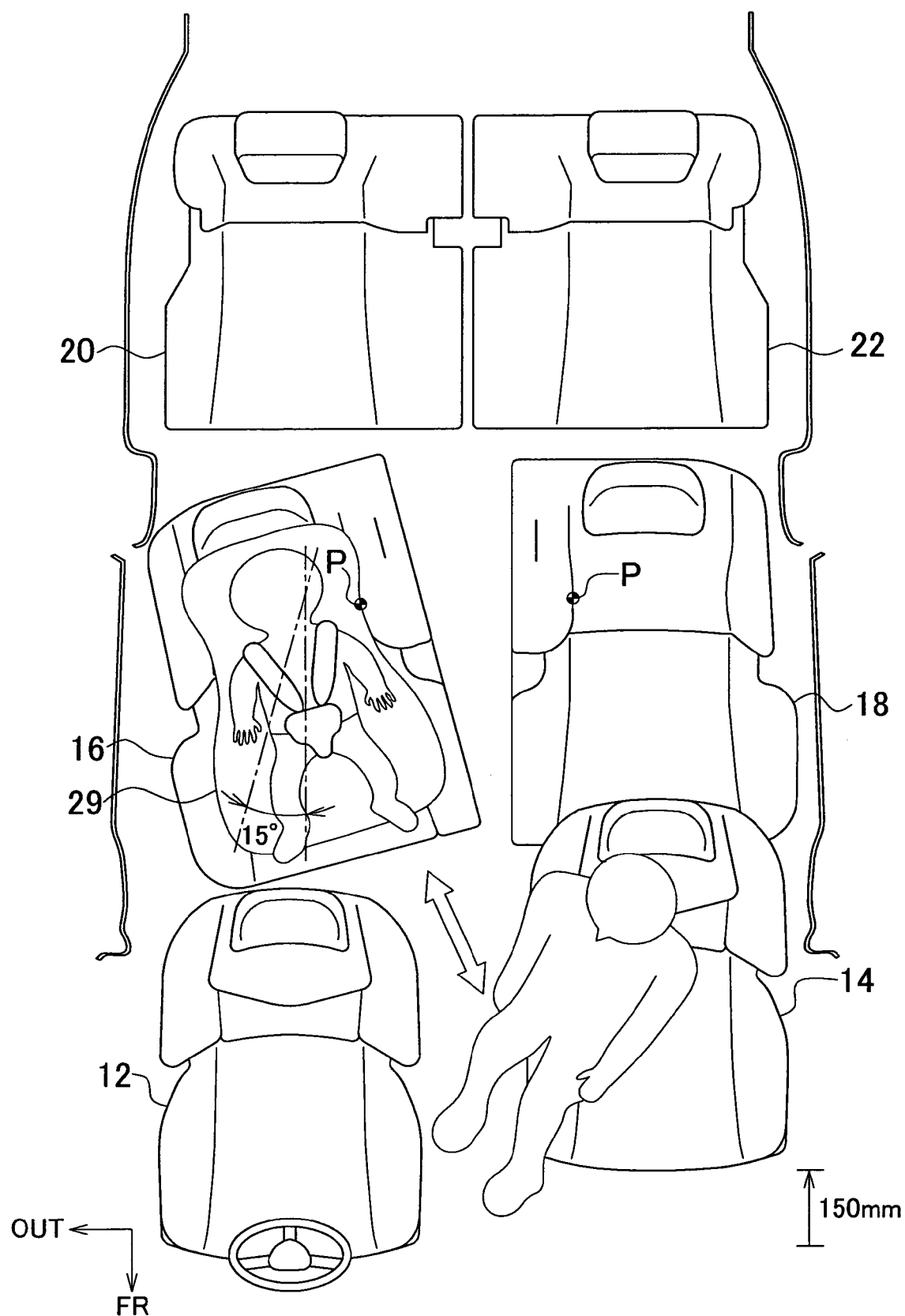
FIG. 7 is a view showing a fourth seat arrangement pattern that is realized by the vehicle seat arranging structure shown in FIG. 1.

Next, a fourth seat arrangement pattern will be described. FIG. 7 shows the fourth seat arrangement pattern that is realized by the vehicle seat arranging structure 10 according to the embodiment of the invention. The fourth seat arrangement pattern shown in FIG. 7 is realized by moving the second-row driver-side seat 16 and the passenger's seat 14 from the positions in the regular seat arrangement pattern shown in FIG. 1 in the following manner. In the fourth seat arrangement pattern shown in FIG. 7, the passenger's seat 14 is placed in a rearward slide position (staggered position) which is reached when the passenger's seat 14 is slid toward the rear of the vehicle by 150 millimeters, and in which the passenger's seat 14 is positioned between the driver's seat 12 and the second-row driver-side seat 16 in the vehicle longitudinal direction. In addition, the second-row driver-side seat 16 is placed in an obliquely-inward frontward-oriented position which is reached when the second-row driver-side seat 16 is swiveled from the frontward-oriented position 15 degrees inward in the vehicle-width direction. The child seat 29 is attached to the second-row driver-side seat 16.

In this way, the passenger's seat 14 comes closer to the second-row driver-side seat 16 and the second-row driver-side seat 16 faces toward the passenger's seat 14. Therefore, the sense of distance between the occupant seated in the passenger's seat 14 and the child seated in the child seat 29 attached to the second-row driver-side seat 16 is reduced. As a result, it is possible to promote communication between the occupant seated in the passenger's seat 14 and the child seated in the child seat 29, and to make it easier for the occupant seated in the passenger's seat 14 to access the child seated in the child seat 29 (that is, to make it easier for the occupant seated in the passenger's seat 14 to take care of the child seated in the child seat 29).

As described above, with the vehicle seat arranging structure 10 according to the embodiment of the invention, it is possible to arrange the vehicle seats more flexibly based on the situations of the occupants seated in the passenger's seat 14 and the second-row driver-side seat 16.

In this case, if the second-row driver-side seat 16 is placed in a frontward slide position (staggered position) which is reached when the second-row driver-side seat 16 is slid toward the front of the vehicle by 150 millimeters, it is possible to further reduce the sense of distance between the occupants seated in the passenger's seat 14 and the second-row driver-side seat 16 to further promote communication between these occupants or to make it easier for the occupant seated in the passenger's seat 14 to access the child seated in the second-row driver-side seat 16.

Figure 8:
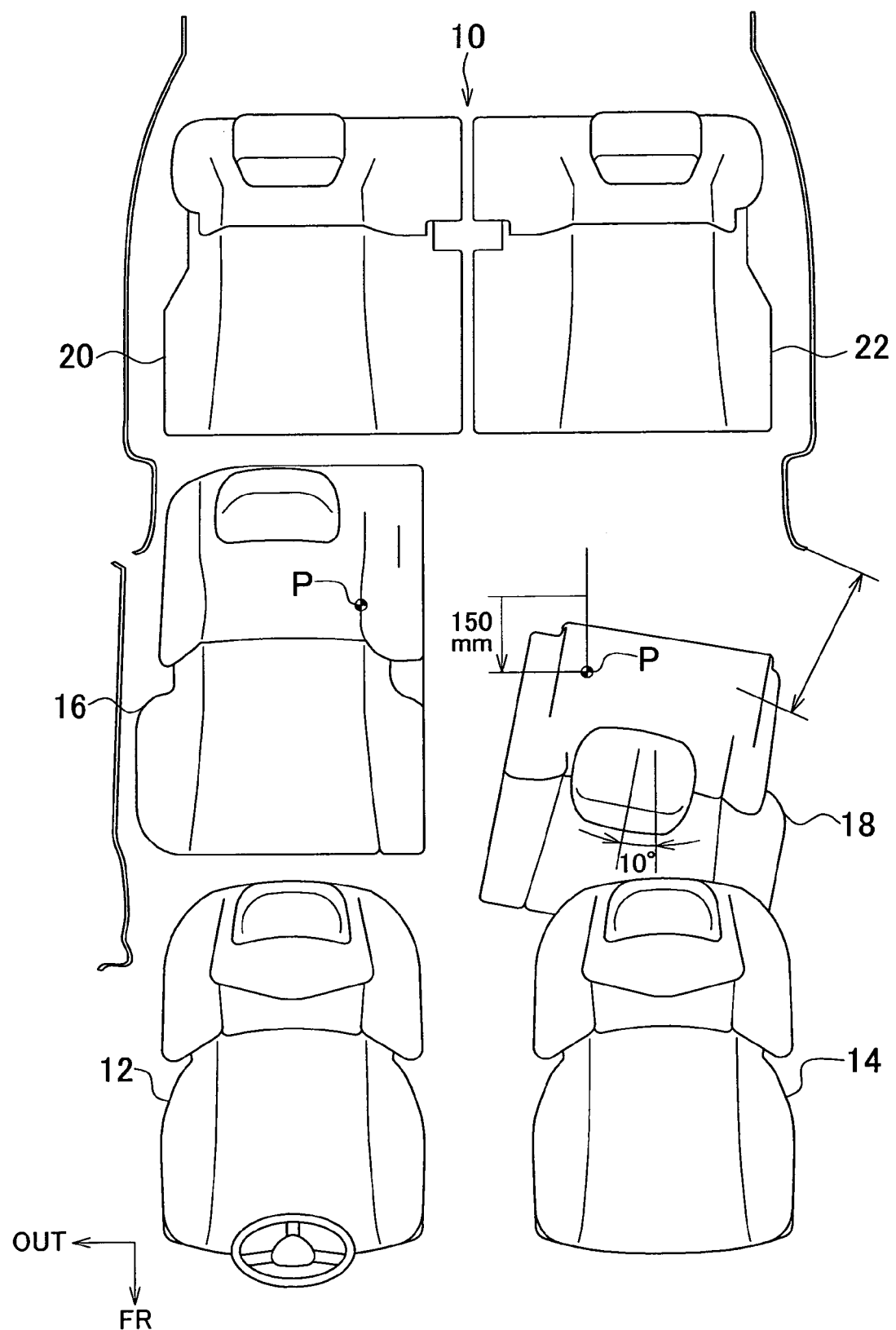
FIG. 8 is a view showing a fifth seat arrangement pattern that is realized by the vehicle seat arranging structure shown in FIG. 1.
Figure 9A:
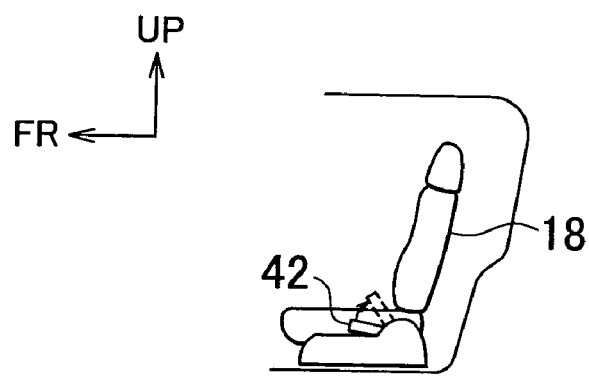
FIGS. 9A, 9B, 9C and 9D are views showing an operation for causing a second-row passenger-side seat in FIG. 8 to take a walk-in attitude.
Figure 9B:
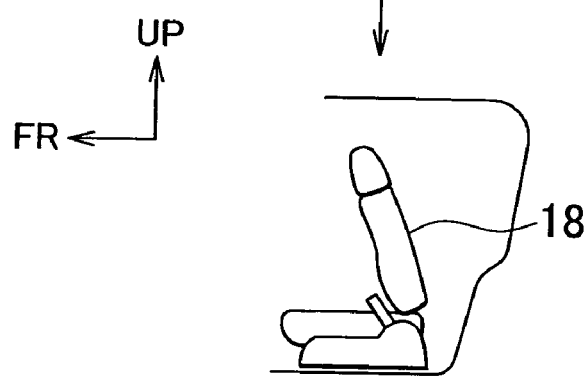
Figure 9C:
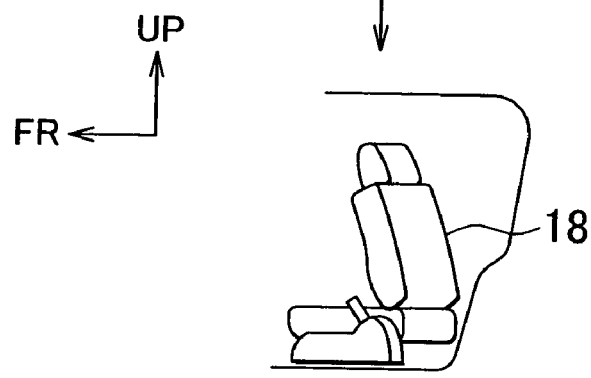
Figure 9D:
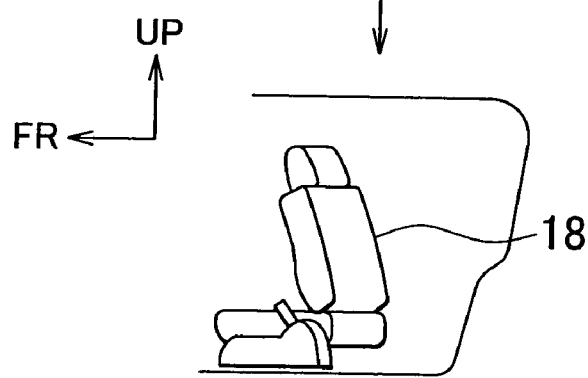
Figure 10A:
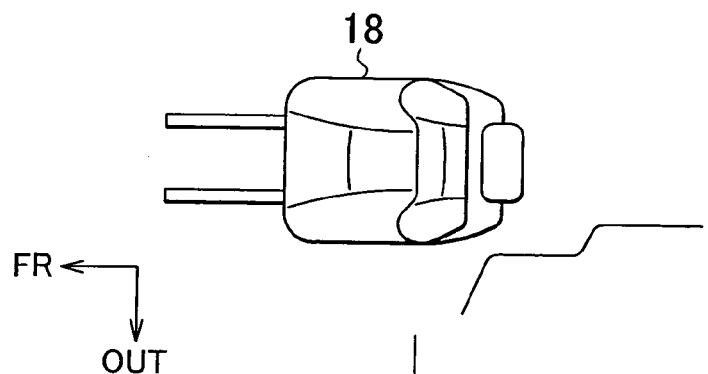
FIGS. 10A, 10B, 10C and 10D are views showing the operation for causing the second-row passenger-side seat in FIG. 8 to take the walk-in attitude.
Figure 10B:
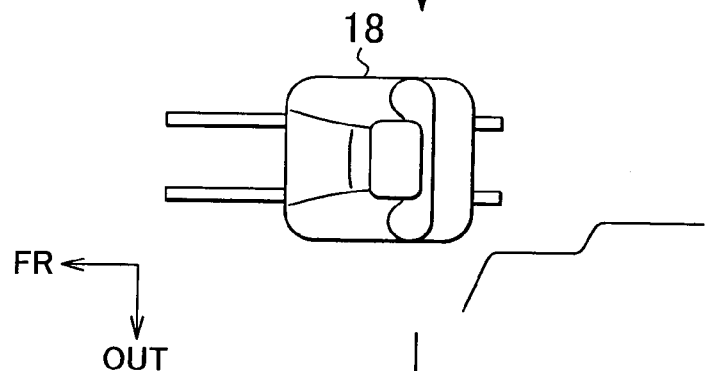
Figure 10C:
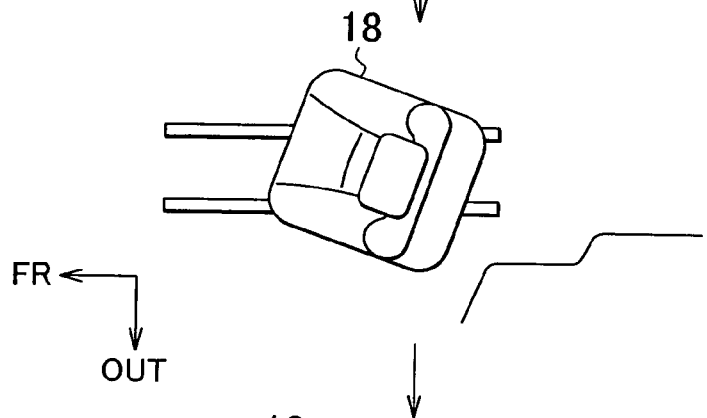
Figure 10D:
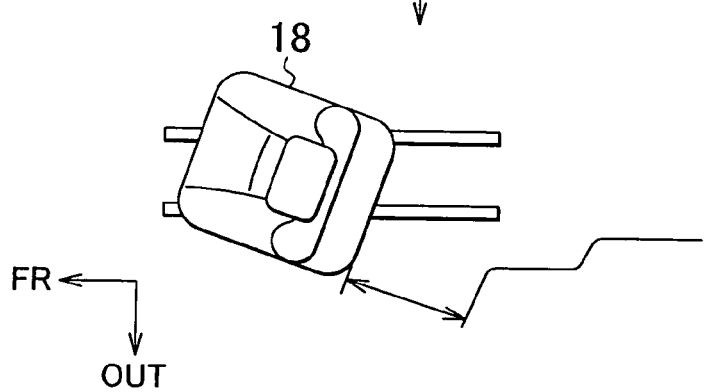

Next, a fifth seat arrangement pattern will be described. FIG. 8 shows the fifth seat arrangement pattern that is realized by the vehicle seat arranging structure according to the embodiment of the invention. FIGS. 9A-9D and FIGS. 10A-10D show the operation that is performed on the second-row passenger-side seat 18 in the fifth seat arrangement pattern when an occupant gets on or off the vehicle.

With the vehicle seat arranging structure 10 according to the embodiment of the invention, the tilt mechanisms 40, the longitudinal sliding lock mechanisms 60A and 60B and the lateral sliding lock mechanism 94 are unlocked in response to an operation of the unlock lever 42 shown in FIG. 11. Thus, according to the procedures shown in FIGS. 9A-9D and FIGS. 10A-10D, the seatback 34 is tilted toward the front of the vehicle, and the entirety of the vehicle seat is oriented obliquely inward in the vehicle-width direction and faces toward the front of the vehicle, and the entirety of the vehicle seat is slid toward the front of the vehicle. In this way, it is possible to easily cause the vehicle seat to take a walk-in attitude that is an appropriate attitude when the occupant gets on or off the vehicle.

Therefore, when the occupant gets on or off the vehicle through a door close to the second-row passenger-side seat 18, as shown in FIG. 8, the second-row passenger-side seat 18 is caused to take the walk-in attitude. Accordingly, it is possible to create wider space for the occupant to get on or off the vehicle, when the second-row passenger-side seat 18 takes the walk-in attitude than when the second-row passenger-side seat 18 is maintained at the frontward-oriented position.

While the invention has been described with reference to the example embodiment thereof, the invention is not limited to the example embodiment. To the contrary, the invention is intended to cover various modifications within the scope of the invention.

For example, in the first seat arrangement pattern shown in FIG. 2, the second-row passenger-side seat 18 is placed in a rearward slide position which is reached when the second-row passenger-side seat 18 is slid toward the rear of the vehicle by 150 millimeters, and in which the second-row passenger-side seat 18 is closer to the rear of the vehicle than the second-row driver-side seat 16. Alternatively, the second-row driver-side seat 16 may be placed in a rearward slide position which is reached when the second-row driver-side seat 16 is slid toward the rear of the vehicle by 150 millimeters, and in which the second-row driver-side seat 16 is closer to the rear of the vehicle than the second-row passenger-side seat 18.

In the second seat arrangement pattern shown in FIG. 4, the second-row passenger-side seat 18 is placed in a rearward slide position (staggered position) which is reached when the second-row passenger-side seat 18 is slid toward the rear of the vehicle by 150 millimeters, and in which the second-row passenger-side seat 18 is closer to the rear of the vehicle than the second-row driver-side seat 16. Alternatively, at least one of the second-row driver-side seat 16 and the second-row passenger-side seat 18 may be slid in the vehicle longitudinal direction in such a manner that the second-row passenger-side seat 18 is closer to the rear of the vehicle than the second-row driver-side seat 16.

In the second seat arrangement pattern shown in FIG. 4, the passenger's seat 14 is placed in a rearward slide position (staggered position) which is reached when the passenger's seat 14 is slid toward the rear of the vehicle by 150 millimeters, and in which the passenger's seat 14 is positioned between the driver's seat 12 and the second-row driver-side seat 16 in the vehicle longitudinal direction. Alternatively, at least one of the driver's seat 12 and the passenger's seat 14 may be slid in the vehicle longitudinal direction in such a manner that the passenger's seat 14 is positioned between the driver's seat 12 and the second-row driver-side seat 16 in the vehicle longitudinal direction.

In the third seat arrangement pattern shown in FIG. 6, the passenger's seat 14 is placed in a frontward slide position (staggered position) which is reached when the passenger's seat 14 is slid toward the front of the vehicle by 150 millimeters. When the passenger's seat 14 is in this frontward slide position, the driver's seat 12 is positioned between the passenger's seat 14 and the second-row passenger-side seat 18 in the vehicle longitudinal direction. Alternatively, at least one of the driver's seat 12 and the passenger's seat 14 may be slid in the vehicle longitudinal direction in such a manner that the driver's seat 12 is positioned between the passenger's seat 14 and the second-row passenger-side seat 18 in the vehicle longitudinal direction.

In the fourth seat arrangement pattern shown in FIG. 7, the passenger's seat 14 is placed in a rearward slide position (staggered position) which is reached when the passenger's seat 14 is slid toward the rear of the vehicle by 150 millimeters, and in which the passenger's seat 14 is positioned between the driver's seat 12 and the second-row driver-side seat 16 in the vehicle longitudinal direction. Alternatively, at least one of the driver's seat 12 and the passenger's seat 14 may be slid in the vehicle longitudinal direction in such a manner that the passenger's seat 14 is positioned between the driver's seat 12 and the second-row driver-side seat 16 in the vehicle longitudinal direction.

In the embodiment of the invention described above, only the second-row driver-side seat 16 and the second-row passenger-side seat 18 are supported by the second-row seat swiveling mechanisms in such a manner that the second-row driver-side seat 16 and the second-row passenger-side seat 18 are allowed to swivel with respect passenger compartment floor. Alternatively, in addition to the second-row driver-side seat 16 and the second-row passenger-side seat 18, the passenger's seat 14 may be supported by a mechanism similar to the second-row seat swiveling mechanism 70 in such a manner that the passenger's seat 14 is allowed to swivel with respect to the passenger compartment floor.

Figure 12:
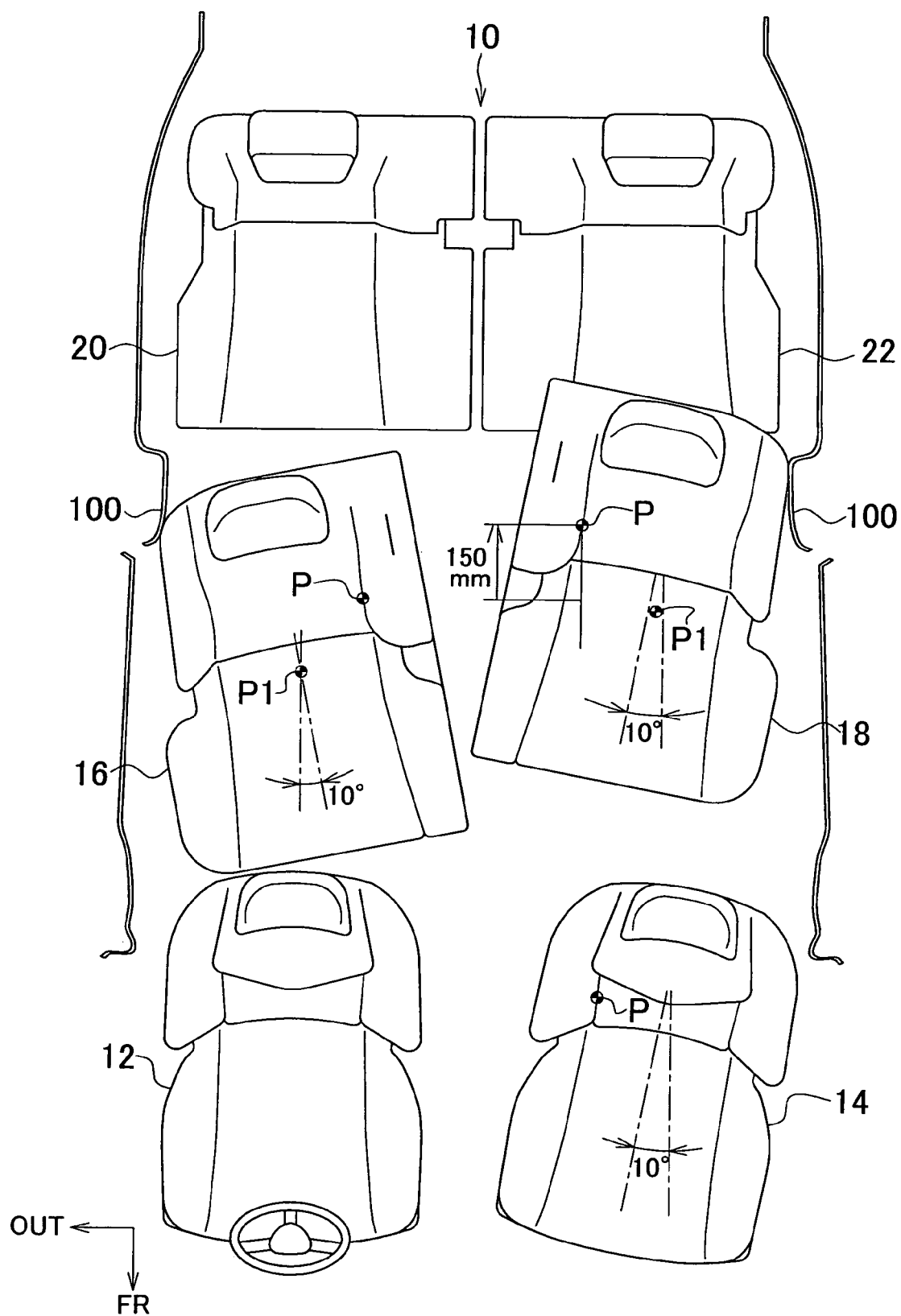
FIG. 12 is a view showing a first modification of the first seat arrangement pattern shown in FIG. 2.

In this case, as shown in FIG. 12, in the above-described first seat arrangement pattern, in addition to the second-row driver-side seat 16 and the second-row passenger-side seat 18, the passenger's seat 14 may be placed in an obliquely-inward frontward-oriented position which is reached when the passenger's seat 14 is swiveled from the frontward-oriented position 10 degrees inward in the vehicle-width direction (this is a first modification of the first seat arrangement pattern).

In this way, the sense of distance among the occupants seated in the second-row driver-side seat 16, the second-row passenger-side seat 18 and the passenger's seat 14 is reduced. Therefore, it is possible to promote communication among these occupants (to make it easier for these occupants to communicate with each other).

Figure 13:
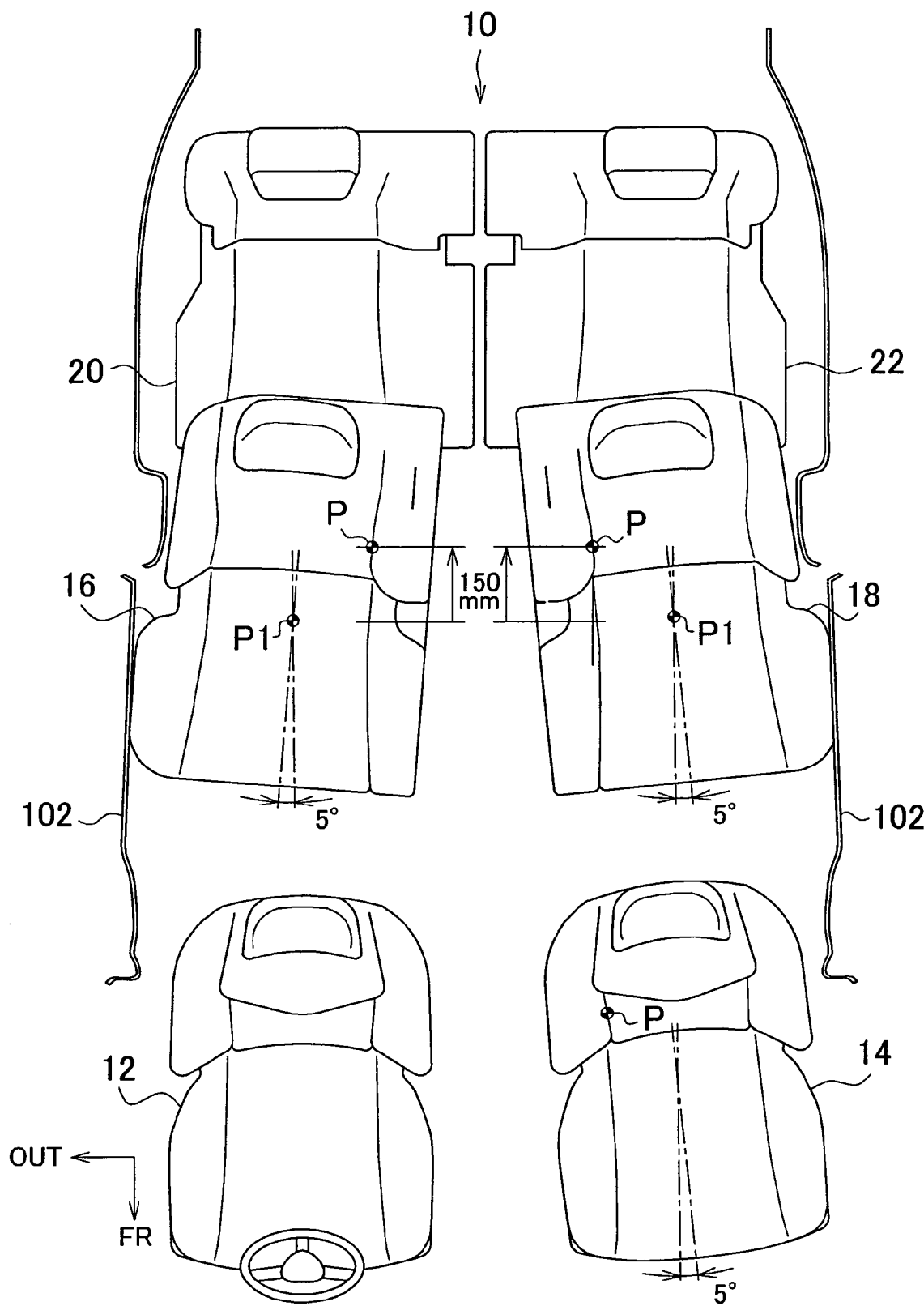
FIG. 13 is a view showing a second modification of the first seat arrangement pattern shown in FIG. 3.

As shown in FIG. 13, in the above-described first seat arrangement pattern, in addition to the second-row driver-side seat 16 and the second-row passenger-side seat 18, the passenger's seat 14 may be placed in an obliquely-outward frontward-oriented position which is reached when the passenger's seat 14 is swiveled from the frontward-oriented position 10 degrees outward in the vehicle-width direction (this is a second modification of the first seat arrangement pattern).

In this way, the sense of distance among the occupants seated in the second-row driver-side seat 16, the second-row passenger-side seat 18 and the passenger's seat 14 is increased. Therefore, it is possible to create a personal space for each of these occupants (for example, a space useful for the occupant to relax or to enjoy scenery seen from a window).

Figure 14:
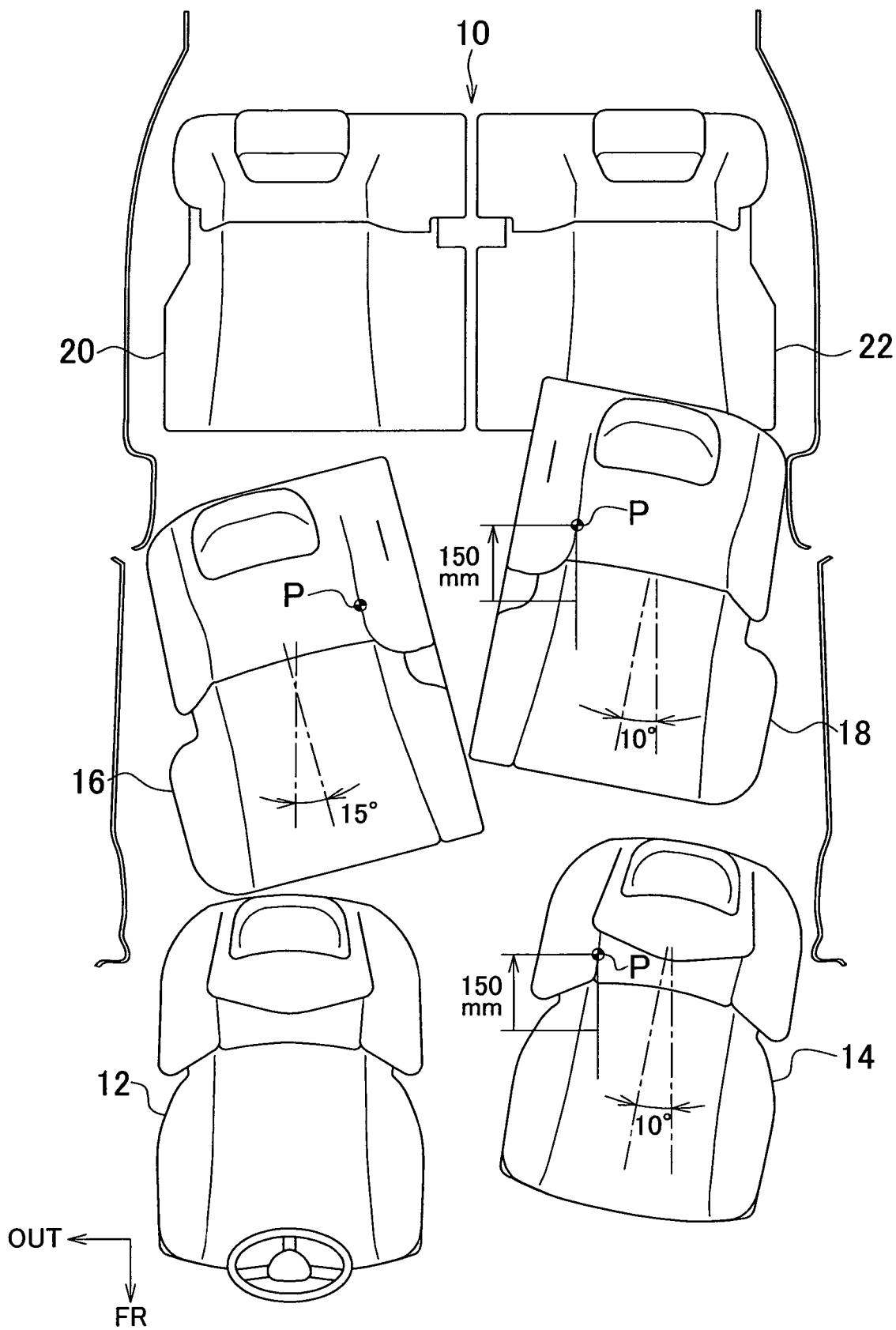
FIG. 14 is a view showing a first modification of the second seat arrangement pattern shown in FIG. 4.

As shown in FIG. 14, in the above-described second seat arrangement pattern, the passenger's seat 14 may be placed in a rearward slide position which is reached when the passenger's seat 14 is slid toward the rear of the vehicle by 150 millimeters and an obliquely-inward frontward-oriented position which is reached when the passenger's seat 14 is swiveled from the frontward-oriented position 10 degrees inward in the vehicle-width direction (this is a first modification of the second seat arrangement pattern).

In this way, the sense of distance among the occupants seated in the second-row driver-side seat 16, the second-row passenger-side seat 18 and the passenger's seat 14 is further reduced. Therefore, it is possible to further promote communication among these occupants (to make it easier for these occupants to communicate with each other).

Figure 15:
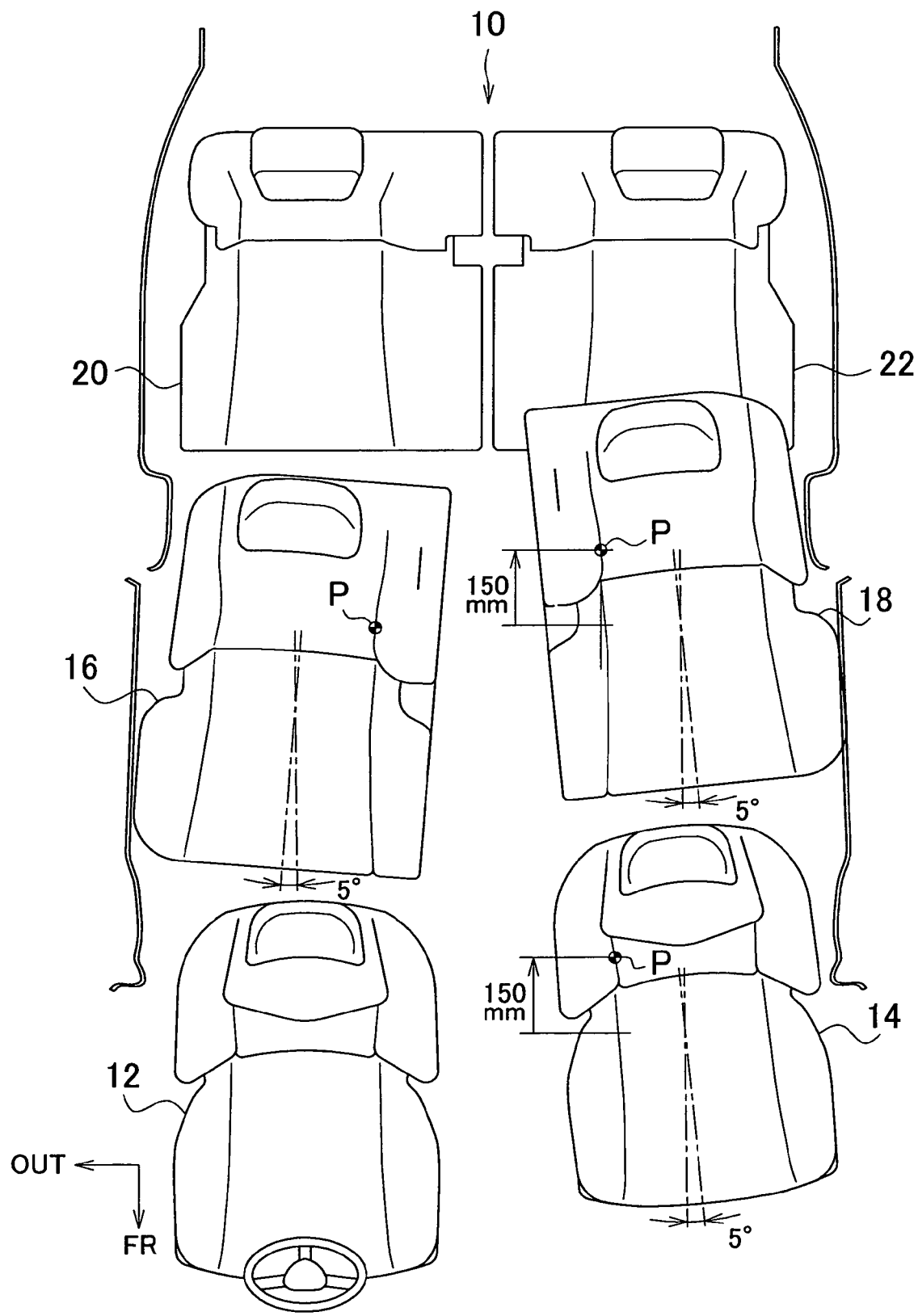
FIG. 15 is a view showing a second modification of the second seat arrangement pattern shown in FIG. 5.

As shown in FIG. 15, in the above-described second seat arrangement pattern, the passenger's seat 14 may be placed in a rearward slide position which is reached when the passenger's seat 14 is slid toward the rear of the vehicle by 150 millimeters and an obliquely-outward frontward-oriented position which is reached when the passenger's seat 14 is swiveled from the frontward-oriented position 5 degrees outward in the vehicle-width direction (this is a second modification of the second seat arrangement pattern).

In this way, the sense of distance among the occupants seated in the second-row driver-side seat 16, the second-row passenger-side seat 18 and the passenger's seat 14 is increased. Therefore, it is possible to create a personal space for each of these occupants (for example, a space useful for the occupant to relax or to enjoy scenery seen from a window).

Figure 16:
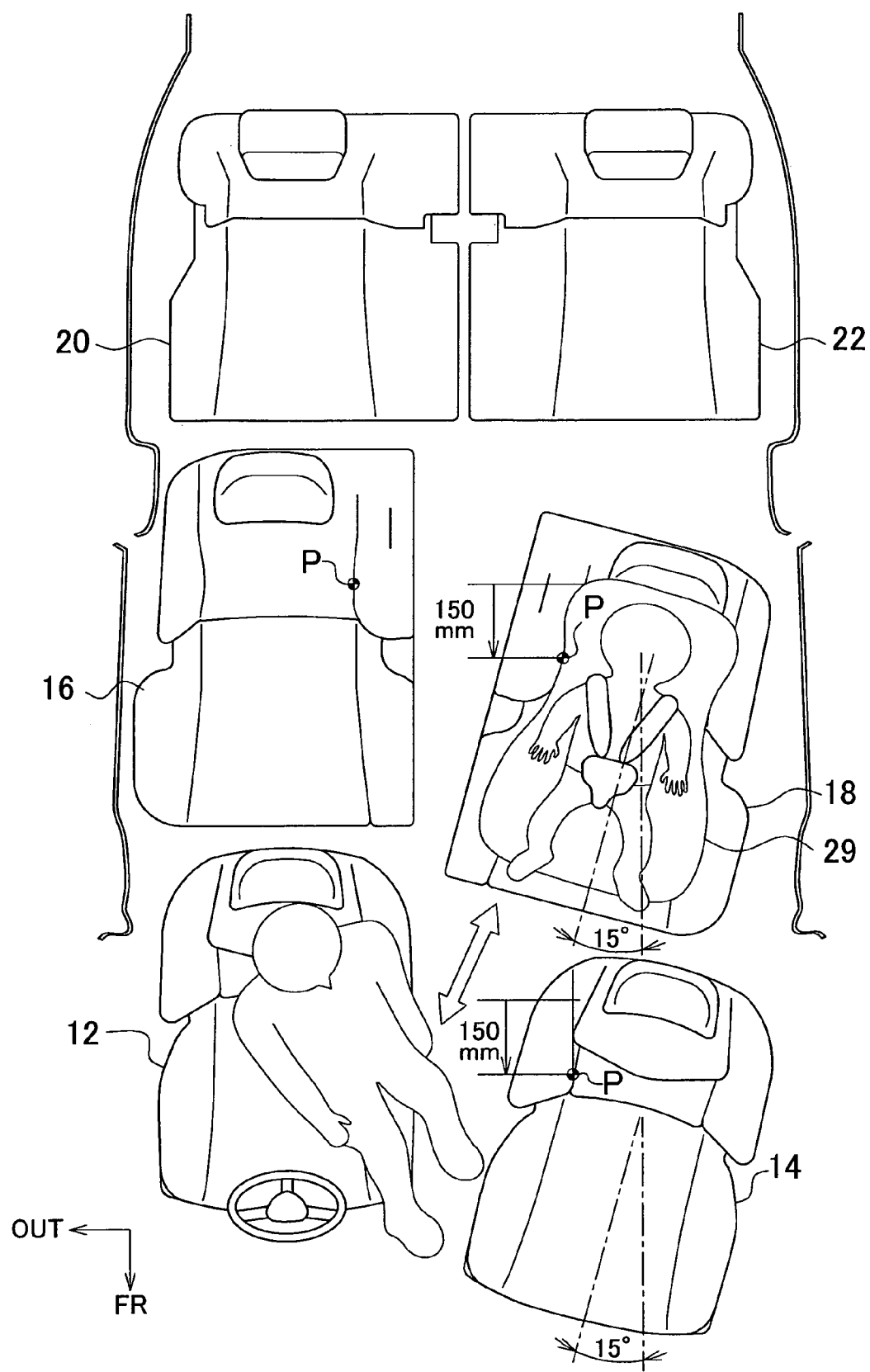
FIG. 16 is a view showing a first modification of the third seat arrangement pattern shown in FIG. 6.

As shown in FIG. 16, in the above-described third seat arrangement pattern, the passenger's seat 14 may be placed in a frontward slide position which is reached when the passenger's seat 14 is slid toward the front of the vehicle by 150 millimeters and an obliquely-inward frontward-oriented position which is reached when the passenger's seat 14 is swiveled from the frontward-oriented position 5 degrees inward in the vehicle-width direction (this is a first modification of the third seat arrangement pattern).

In this way, the occupant seated in the driver's seat 12 can easily place child goods such as toys and diapers for the child seated in the child seat 29 on the seat cushion of the passenger's seat 14. Also, the occupant seated in the passenger's seat 14 can easily help the occupant seated in the driver's seat 12 or take care of the child seated in the child seat 29.

Figure 17:
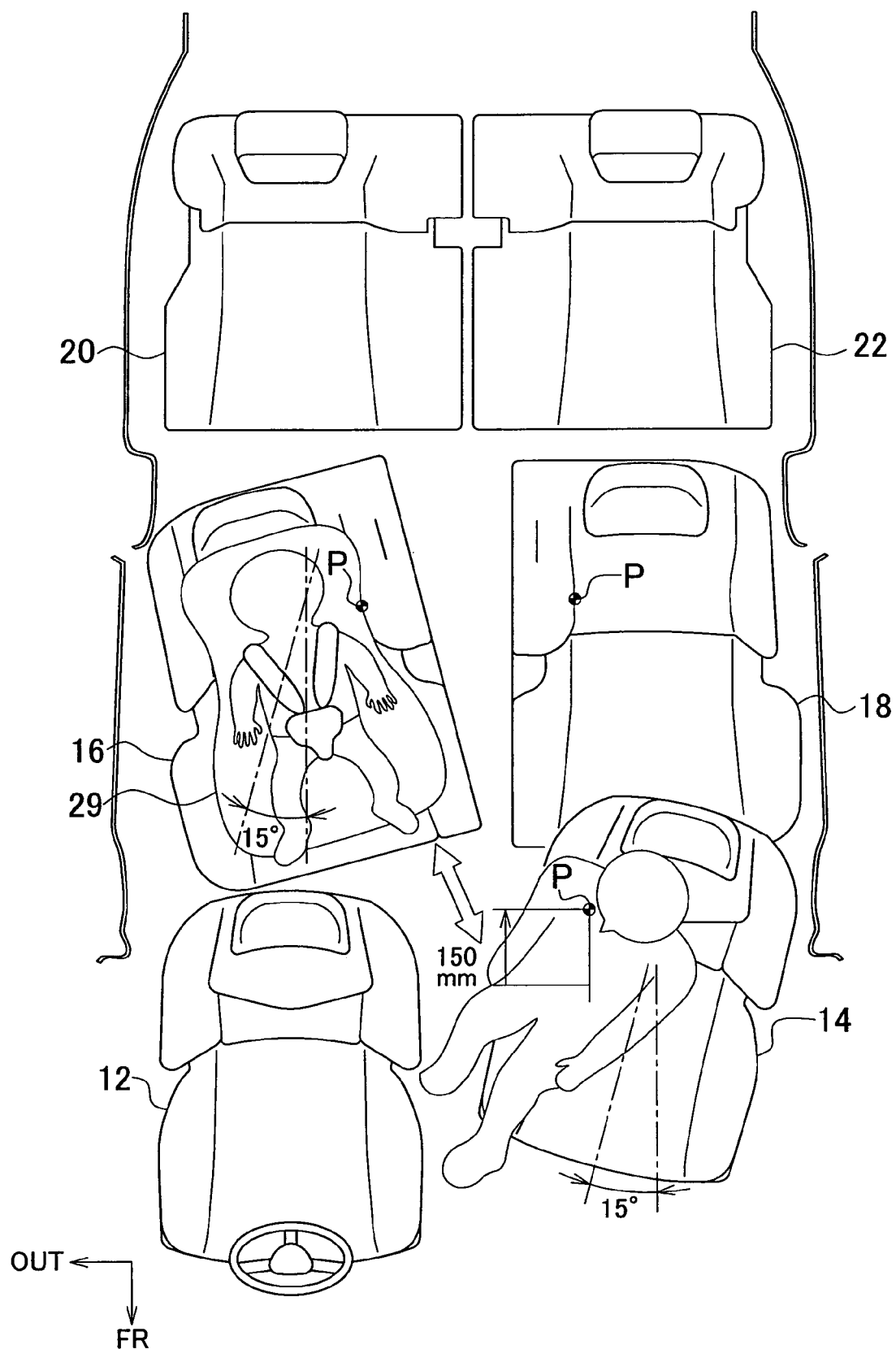
FIG. 17 is a view showing a first modification of the fourth seat arrangement pattern shown in FIG. 7.

As shown in FIG. 17, in the above-described fourth seat arrangement pattern, the passenger's seat 14 may be placed in a rearward slide position which is reached when the passenger's seat 14 is slid toward the rear of the vehicle by 150 millimeters and an obliquely-inward frontward-oriented position which is reached when the passenger's seat 14 is swiveled from the frontward-oriented position 15 degrees inward in the vehicle-width direction (this is a first modification of the fourth seat arrangement).

In this way, the occupant seated in the passenger's seat 14 can access the child seated in the child seat 29 more easily (that is, the occupant seated in the passenger's seat 14 can take care of the child seated in the child seat 29 more easily).

If the passenger's seat 14, in addition to the second-row driver-side seat 16 and the second-row passenger-side seat 18, is supported by a mechanism similar to the second-row seat swiveling mechanism 70 in such a manner that the passenger's seat 14 is allowed to swivel with respect to the passenger compartment floor, it is possible to arrange the vehicle seats more flexibly based on the conditions of the occupants seated in the passenger's seat 14, the second-row driver-side seat 16 and the second-row passenger-side seat 18. Thus, it is possible to further enhance the comfort in the passenger compartment.

In the embodiment of the invention and the modifications of the embodiment, the second-row driver-side seat 16, the second-row passenger-side seat 18, and the passenger's seat 14 are allowed to slide and swivel with respect to the passenger compartment floor. Alternatively, at least one of the second-row driver-side seat 16, the second-row passenger-side seat 18, and the passenger's seat 14 may be allowed to slide and swivel with respect to the passenger compartment floor.

In the embodiment of the invention and the modifications of the embodiment, the second-row driver-side seat 16, the second-row passenger-side seat 18 and the passenger's seat 14 are allowed to slide and swivel with respect to the passenger compartment floor. Alternatively, other vehicle seats such as the third-row seats 20 and 22 may be allowed to slide and swivel with respect to the passenger compartment floor.

In the embodiment of the invention described above, the vehicle seat arranging structure 10 is applied to a passenger automobile, for example, a mini-van. Alternatively, the vehicle seat arranging structure 10 may be applied to other vehicles, for example, automobiles such as a minibus and a motorcoach, a railroad vehicle, a passenger airplane, and a marine vessel.

While the invention has been described with reference to the example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the scope of the invention.

The invention claimed is:

1. A vehicle seat arranging structure, comprising:
a plurality of vehicle seats;
a seat sliding mechanism that supports at least one of the plurality of vehicle seats in such a manner that the vehicle seat supported by the seat sliding mechanism is allowed to slide with respect to a passenger compartment floor in a longitudinal direction of a vehicle; and
a seat swiveling mechanism that supports at least one of the plurality of vehicle seats in such a manner that the vehicle seat supported by the seat swiveling mechanism is allowed to swivel with respect to the passenger compartment floor about a position that deviates from a longitudinal and lateral center of a seat cushion inward in a vehicle-width direction and rearward in the vehicle longitudinal direction so as to be placed in any one of a frontward-oriented position, in which the vehicle seat supported by the seat swiveling mechanism faces a front of the vehicle, an obliquely-outward frontward-oriented position, in which the vehicle seat supported by the seat swiveling mechanism is oriented obliquely outward in the vehicle width-direction and faces the front of the vehicle, and an obliquely-inward frontward-oriented position, in which the vehicle seat supported by the seat swiveling mechanism is oriented obliquely inward in the vehicle-width direction and faces the front of the vehicle, wherein an angle by which the vehicle seat is swiveled from the frontward-oriented position to the obliquely-outward frontward-oriented position is set to be smaller than an angle by which the vehicle seat is swiveled from the frontward-oriented position to the obliquely-inward frontward-oriented position.

2. A vehicle seat arranging structure, comprising:
a driver's seat and a passenger's seat;
a second-row driver-side seat and a second-row passenger-side seat that are arranged behind the driver's seat and the passenger's seat, respectively;
a second-row seat sliding mechanism that supports each of the second-row driver-side seat and the second-row passenger-side seat in such a manner that each of the second-row driver-side seat and the second-row passenger-side seat is allowed to slide with respect to a passenger compartment floor in a longitudinal direction of a vehicle; and
a second-row seat swiveling mechanism that supports each of the second-row driver-side seat and the second-row passenger-side seat in such a manner that each of the second-row driver-side seat and the second-row passenger-side seat is allowed to swivel with respect to the passenger compartment floor about a position that deviates from a longitudinal and lateral center of a seat cushion inward in a vehicle-width direction and rearward in the vehicle longitudinal direction so as to be placed in any one of a frontward-oriented position, in which each of the second-row driver-side seat and the second-row passenger-side seat faces a front of the vehicle, an obliquely-outward frontward-oriented position, in which each of the second-row driver-side seat and the second-row passenger-side seat is oriented obliquely outward in the vehicle width-direction and faces the front of the vehicle, and an obliquely-inward frontward-oriented position, in which each of the second-row driver-side seat and the second-row passenger-side seat is oriented obliquely inward in the vehicle-width direction and faces the front of the vehicle, wherein an angle by which each of the second-row driver-side seat and the second-row passenger-side seat is swiveled from the frontward-oriented position to the obliquely-outward frontward-oriented position is set to be smaller than an angle by which each of the second-row driver-side seat and the second-row passenger-side seat is swiveled from the frontward-oriented position to the obliquely-inward frontward-oriented position.

3. The vehicle seat arranging structure according to claim 2, wherein:
the second-row seat sliding mechanism includes a sliding lock device that retains at least one of the second-row driver-side seat and the second-row passenger-side seat at a desired slide position in the longitudinal direction of the vehicle;
the second-row seat swiveling mechanism includes a swiveling lock device that retains at least one of the second-row driver-side seat and the second-row passenger-side seat in the frontward-oriented position;
at least one of the second-row driver-side seat and the second-row passenger-side seat includes a tilting lock device that retains a seatback at a desired angle with respect to the seat cushion; and
there is provided an unlock device that places the sliding lock device and the swiveling lock device in an unlocked mode in response to unlocking of the tilting lock device.

4. A vehicle seat arranging structure, comprising:
a driver's seat and a passenger's seat;
a second-row driver-side seat and a second-row passenger-side seat that are arranged behind the driver's seat and the passenger's seat, respectively;
a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in a longitudinal direction of a vehicle so as to be placed in any one of a side-by-side position and a staggered position, wherein the driver's seat and the passenger's seat are aligned and next to each other in a vehicle-width direction when the vehicle seat supported by the front seat sliding mechanism is in the side-by-side position, and the passenger's seat is positioned between the driver's seat and the second-row driver-side seat in the longitudinal direction of the vehicle when the vehicle seat supported by the front seat sliding mechanism is in the staggered position;
a second-row seat sliding mechanism that supports at least one of the second-row driver-side seat and the second-row passenger-side seat in such a manner that at least one of second-row driver-side seat and the second-row passenger-side seat supported by the second-row seat sliding mechanism is allowed to slide with respect to the passenger compartment floor in the longitudinal direction of the vehicle so as to be placed in any one of a side-by-side position and a staggered position, wherein the second-row driver-side seat and the second-row passenger-side seat are aligned and next to each other in the vehicle-width direction when the vehicle seat supported by the second-row seat sliding mechanism is in the side-by-side position, and the second-row passenger-side seat is closer to a rear of the vehicle than the second-row driver-side seat when the vehicle seat supported by the second-row seat sliding mechanism is in the staggered position; and
a second-row seat swiveling mechanism that supports each of the second-row driver-side seat and the second-row passenger-side seat in such a manner that each of the second-row driver-side seat and the second-row passenger-side seat is allowed to swivel-with respect to the passenger compartment floor about a position that deviates from a longitudinal and lateral center of a seat cushion inward in the vehicle-width direction and rearward in the vehicle longitudinal direction so as to be placed in any one of a frontward-oriented position, in which each of the second-row driver-side seat and the second-row passenger-side seat faces a front of the vehicle, and an obliquely-inward frontward-oriented position, in which each of the second-row driver-side seat and the second-row passenger-side seat is oriented obliquely inward in the vehicle-width direction and faces the front of the vehicle, wherein an angle by which each of the second-row driver-side seat and the second-row passenger-side seat is swiveled from the frontward-oriented position to an obliquely-outward frontward-oriented position is set to be smaller than an angle by which each of the second-row driver-side seat and the second-row passenger-side seat is swiveled from the frontward-oriented position to the obliquely-inward frontward-oriented position.

5. The vehicle seat arranging structure according to claim 4, wherein the second-row seat swiveling mechanism supports each of the second-row driver-side seat and the second-row passenger-side seat in such a manner that each of the second-row driver-side seat and the second-row passenger-side seat is allowed to swivel with respect to the passenger compartment floor so as to be placed in the obliquely-outward frontward-oriented position, in which each of the second-row driver-side seat and-the second-row passenger-side seat is oriented obliquely outward in the vehicle-width direction and faces the front of the vehicle.

6. The vehicle seat arranging structure according to claim 2, further comprising:
a third-row seat that is arranged behind the second-row driver-side seat and the second-row passenger-side seat.

7. A vehicle seat arranging structure, comprising:
a driver's seat and a passenger's seat;
a second-row driver-side seat and a second-row passenger-side seat that are arranged behind the driver's seat and the passenger's seat, respectively;
a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in a longitudinal direction of a vehicle so as to be placed in any one of a side-by-side position and a staggered position, wherein the driver's seat and the passenger's seat are aligned and next to each other in a vehicle-width direction when the vehicle seat supported by the front seat sliding mechanism is in the side-by-side position and the driver's seat is positioned between the passenger's seat and the second-row passenger-side seat in the longitudinal direction of the vehicle when the vehicle seat supported by the front seat sliding mechanism is in the staggered position; and
a second-row seat swiveling mechanism that supports the second-row passenger-side seat in such a manner that the second row passenger-side seat is allowed to swivel with respect to the passenger compartment floor about a position that deviates from a longitudinal and lateral center of a seat cushion inward in the vehicle-width direction and rearward in the vehicle longitudinal direction so as to be placed in any one of a frontward-oriented position, in which the second-row passenger-side seat faces a front of the vehicle, an obliquely outward frontward-oriented position, in which the second-row passenger-side seat is oriented obliquely outward in the vehicle-width direction and faces the front of the vehicle, and an obliquely-inward frontward-oriented position, in which the second-row passenger-side seat is oriented obliquely inward in the vehicle-width direction and faces the front of the vehicle, wherein an angle by which the second-row passenger-side seat is swiveled from the frontward-oriented position to the obliquely-outward frontward-oriented position is set to be smaller than an angle by which the second-row passenger-side seat is swiveled from the frontward-oriented position to the obliquely-inward frontward-oriented position.

8. The vehicle seat arranging structure according to claim 7, further comprising:
a second-row seat sliding mechanism that supports the second-row passenger-side seat in such a manner that the second-row passenger-side seat is allowed to slide with respect to the passenger compartment floor in the longitudinal direction of the vehicle so as to be placed in any one of a side-by-side position, in which the second-row passenger-side seat is aligned with and next to the second-row driver-side seat in the vehicle-width direction, and a staggered position, in which second-row passenger-side seat is closer to the front of the vehicle than the second-row driver-side seat.

9. A vehicle seat arranging structure, comprising:
a driver's seat and a passenger's seat;
a second-row driver-side seat and a second-row passenger-side seat that are arranged behind the driver's seat and the passenger's seat, respectively;
a front seat sliding mechanism that supports at least one of the driver's seat and the passenger's seat in such a manner that at least one of the driver's seat and the passenger's seat supported by the front seat sliding mechanism is allowed to slide with respect to a passenger compartment floor in a longitudinal direction of a vehicle so as to be placed in any one of a side-by-side position and a staggered position, wherein the driver's seat and the passenger's seat are aligned and next to each other in a vehicle-width direction when the vehicle seat supported by the front seat sliding mechanism is in the side-by-side position, and the passenger's seat is positioned between the driver's seat and the second-row driver-side seat in the longitudinal direction of the vehicle when the vehicle seat supported by the front seat sliding mechanism is in the staggered position; and
a second-row seat swiveling mechanism that supports the second-row driver-side seat in such a manner that the second-row driver-side seat is allowed to swivel with respect to the passenger compartment floor about a position that deviates from a longitudinal and lateral center of a seat cushion inward in the vehicle-width direction and rearward in the vehicle longitudinal direction so as to be placed in any one of a frontward-oriented position, in which the second-row driver-side seat faces a front of the vehicle, an obliquely-outward frontward-oriented position, in which the second-row driver-side seat is oriented obliquely outward in the vehicle-width direction and faces the front the vehicle, and an obliquely-inward frontward-oriented position, in which the second-row driver-side seat is oriented obliquely inward in the vehicle-width direction and faces the front of the vehicle, wherein an angle by which the second-row driver-side seat is swiveled from the frontward-oriented position to the obliquely-outward frontward-oriented position is set to be smaller than an angle by which the second-row driver-side seat is swiveled from the frontward-oriented position to the obliquely-inward frontward-oriented position.

10. The vehicle seat arranging structure according to claim 9, further comprising:
a second-row seat sliding mechanism that supports the second-row driver-side seat in such a manner that the second-row driver-side seat is allowed to slide with respect to the passenger compartment floor in the longitudinal direction of the vehicle so as to be placed in any one of a side-by-side position, in which the second-row driver-side seat is aligned with and next to the second-row passenger-side seat in the vehicle-width direction, and a staggered position, in which the second-row driver-side seat is closer to the front of the vehicle than the second-row passenger-side seat.

11. The vehicle seat arranging structure according to claim 2, further comprising:
a passenger's seat swiveling mechanism that supports the passenger's seat in such a manner that the passenger's seat is allowed to swivel with respect to the passenger compartment floor about a position that deviates from a longitudinal and lateral center of a seat cushion inward in the vehicle-width direction so as to be placed in any one of a frontward-oriented position in which the passenger's seat faces the front of the vehicle, an obliquely-outward frontward-oriented position, in which the passenger's seat is oriented obliquely outward in the vehicle-width direction and faces the front of the vehicle, and an obliquely-inward frontward-oriented position, in which the passenger's seat is oriented obliquely inward in the vehicle-width direction and faces the front of the vehicle.

12. The vehicle seat arranging structure according to claim 4, further comprising:
a third-row seat that is arranged behind the second-row driver-side seat and the second-row passenger-side seat.

13. The vehicle seat arranging structure according to claim 4, further comprising:
a passenger's seat swiveling mechanism that supports the passenger's seat in such a manner that the passenger's seat is allowed to swivel with respect to the passenger compartment floor about a position that deviates from a longitudinal and lateral center of a seat cushion inward in the vehicle-width direction so as to be placed in any one of a frontward-oriented position in which the passenger's seat faces the front of the vehicle, the obliquely-outward frontward-oriented position, in which the passenger's seat is oriented obliquely outward in the vehicle-width direction and faces the front of the vehicle, and an obliquely-inward frontward-oriented position, in which the passenger's seat is oriented obliquely inward in the vehicle-width direction and faces the front of the vehicle.

14. The vehicle seat arranging structure according to claim 7, further comprising:
a passenger's seat swiveling mechanism that supports the passenger's seat in such a manner that the passenger's seat is allowed to swivel with respect to the passenger compartment floor about a position that deviates from a longitudinal and lateral center of a seat cushion inward in the vehicle-width direction so as to be placed in any one of a frontward-oriented position in which the passenger's seat faces the front of the vehicle, an obliquely-outward frontward-oriented position, in which the passenger's seat is oriented obliquely outward in the vehicle-width direction and faces the front of the vehicle, and an obliquely-inward frontward-oriented position, in which the passenger's seat is oriented obliquely inward in the vehicle-width direction and faces the front of the vehicle.

15. The vehicle seat arranging structure according to claim 9, further comprising:

a passenger's seat swiveling mechanism that supports the passenger's seat in such a manner that the passenger's seat is allowed to swivel with respect to the passenger compartment floor about a position that deviates from a longitudinal and lateral center of a seat cushion inward in the vehicle-width direction so as to be placed in any one of a frontward-oriented position in which the passenger's seat faces the front of the vehicle, an obliquely-outward frontward-oriented position, in which the passenger's seat is oriented obliquely outward in the vehicle-width direction and faces the front of the vehicle, and an obliquely-inward frontward-oriented position, in which the passenger's seat is oriented obliquely inward in the vehicle-width direction and faces the front of the vehicle.

* * * * *